US012430680B2

(12) United States Patent
Chalkley et al.

(10) Patent No.: US 12,430,680 B2
(45) Date of Patent: Sep. 30, 2025

(54) PHYSICAL STORAGE VAULT FOR PHYSICAL ITEMS OF DIGITAL TWIN NFTs

(71) Applicant: eBay Inc., San Jose, CA (US)

(72) Inventors: Andrew Chalkley, Portland, OR (US); Eswara Satya Pavan Rajesh Pinapala, Newark, CA (US); Ganesh Kautik Talele, Saratoga, CA (US); Michael Cheung, San Francisco, CA (US); Akshada Ravindra More, Santa Clara, CA (US); Tsun Kwan Donald Siu, San Mateo, CA (US)

(73) Assignee: eBay Inc., San Jose, CA (US)

( * ) Notice: Subject to any disclaimer, the term of this patent is extended or adjusted under 35 U.S.C. 154(b) by 392 days.

(21) Appl. No.: 17/481,579

(22) Filed: Sep. 22, 2021

(65) Prior Publication Data

US 2023/0088936 A1 Mar. 23, 2023

(51) Int. Cl.
*H04L 9/32* (2006.01)
*G06Q 10/083* (2023.01)
*G06Q 30/0601* (2023.01)
*H04L 9/00* (2022.01)

(52) U.S. Cl.
CPC ....... *G06Q 30/0635* (2013.01); *G06Q 10/083* (2013.01); *H04L 9/3213* (2013.01); *H04L 9/50* (2022.05)

(58) Field of Classification Search
CPC ......... H04L 9/3213; H04L 9/50; G06Q 10/08; G06Q 10/0835; G06Q 10/087; G06Q 10/00; G06Q 30/0635; G06Q 10/083
See application file for complete search history.

(56) References Cited

U.S. PATENT DOCUMENTS

| 11,257,023 | B1 * | 2/2022 | Rafii | H04L 67/52 |
| 12,177,366 | B1 * | 12/2024 | Norton | H04L 9/50 |
| 2011/0030047 | A1 * | 2/2011 | Gao | H04W 12/068 726/28 |
| 2015/0227882 | A1 * | 8/2015 | Bhatt | G06Q 10/083 705/330 |
| 2016/0350728 | A1 * | 12/2016 | Melika | G06Q 20/3829 |
| 2020/0005388 | A1 | 1/2020 | Lim et al. | |
| 2020/0160289 | A1 * | 5/2020 | Mahajan | G06Q 20/02 |
| 2020/0160320 | A1 * | 5/2020 | Williams | G06Q 20/40 |

(Continued)

OTHER PUBLICATIONS 22195826.7 , "Extended European Search Report", EP Application No. 22195826.7, Jan. 30, 2023, 10 pages.

*Primary Examiner* — Ali S Abyaneh
(74) *Attorney, Agent, or Firm* — FIG. 1 Patents

(57) ABSTRACT

A physical storage vault for physical items of digital twin NFTs is described. A combined listing for a physical item and an NET of the physical item is generated, and the combined listing is output in a user interface at a client device. The user interface includes an option to store the physical item in a physical storage vault. A request is received from the client device to transfer ownership of the physical item and the NFT of the combined listing to a user account. The request indicates that the option to store the physical item in the physical storage vault is accepted. Responsive to the request, transfer of ownership of the NET to the user account is initiated by encoding metadata of the NFT on a blockchain with an identifier associated with the user account and by storing the physical item in the physical storage vault.

20 Claims, 8 Drawing Sheets

(56) References Cited

U.S. PATENT DOCUMENTS

| | | |
|---|---|---|
| 2020/0273048 A1 | 8/2020 | Andon et al. |
| 2021/0035092 A1 | 2/2021 | Pierce et al. |
| 2021/0150616 A1* | 5/2021 | Kentris .............. G06Q 10/0837 |
| 2021/0279695 A1 | 9/2021 | Rice |
| 2022/0239495 A1* | 7/2022 | Norton ................. H04L 9/0825 |
| 2022/0374888 A1* | 11/2022 | Lackey .............. G06Q 20/3827 |
| 2022/0383303 A1* | 12/2022 | Mullen ................ G06Q 20/389 |
| 2023/0031817 A1* | 2/2023 | Mulas .................. G06Q 20/208 |
| 2023/0045071 A1* | 2/2023 | Kalaldeh .............. G06Q 30/018 |
| 2023/0055064 A1* | 2/2023 | Dalmia ................. G06Q 50/01 |
| 2023/0079195 A1* | 3/2023 | Matheson .......... G06Q 20/0655 |
| | | 705/44 |

* cited by examiner

PHYSICAL STORAGE VAULT FOR PHYSICAL ITEMS OF DIGITAL TWIN NFTs

BACKGROUND

Advances in technology, such as dramatic increases in computing power for smaller and smaller devices and development of more user-friendly tools for creating digital content, have led to the proliferation of digital content. Many creators of and/or persons responsible for popular digital content may want to receive a benefit for their role in making such digital content popular. In other words, they wish to have this digital content treated as an asset—a "digital asset." Non-fungible tokens (NFTs) are one mechanism that enable digital content to be treated as assets, and do so by programmatically encoding a unique identity of an original digital asset which distinguishes it from copies of the asset. By using NFTs, a provenance of the digital asset is also tracked—a transfer of the digital asset cannot occur, due to programmatic features of NFTs, without the transfer being digitally recorded.

Because of this ability to uniquely identify an asset from other assets and because of the functionality to record every transaction involving the asset, developments are being made to use NFTs in connection with physical items, e.g., luxury goods. In contrast to purely digital assets, though, the transfer of valuable physical items as a result of a transaction poses vastly different problems, e.g., packaging and shipping the physical item to transfer ownership, and maintaining security of the physical item while it "changes hands".

SUMMARY

To overcome these problems, a physical storage vault for physical items of digital twin NFTs is leveraged. A combined listing for a physical item and a non-fungible token (NET) of the physical item is generated, and the combined listing is output in a user interface at a client device. The user interface includes an option to store the physical item in a physical storage vault. A request is received from the client device to transfer ownership of the physical item and the NFT of the combined listing to a user account. The request indicates that the option to store the physical item in the physical storage vault is accepted. Responsive to the request, transfer of ownership of the NET to the user account is initiated by encoding metadata of the NET on a blockchain with an identifier associated with the user account and by storing the physical item in the physical storage vault.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
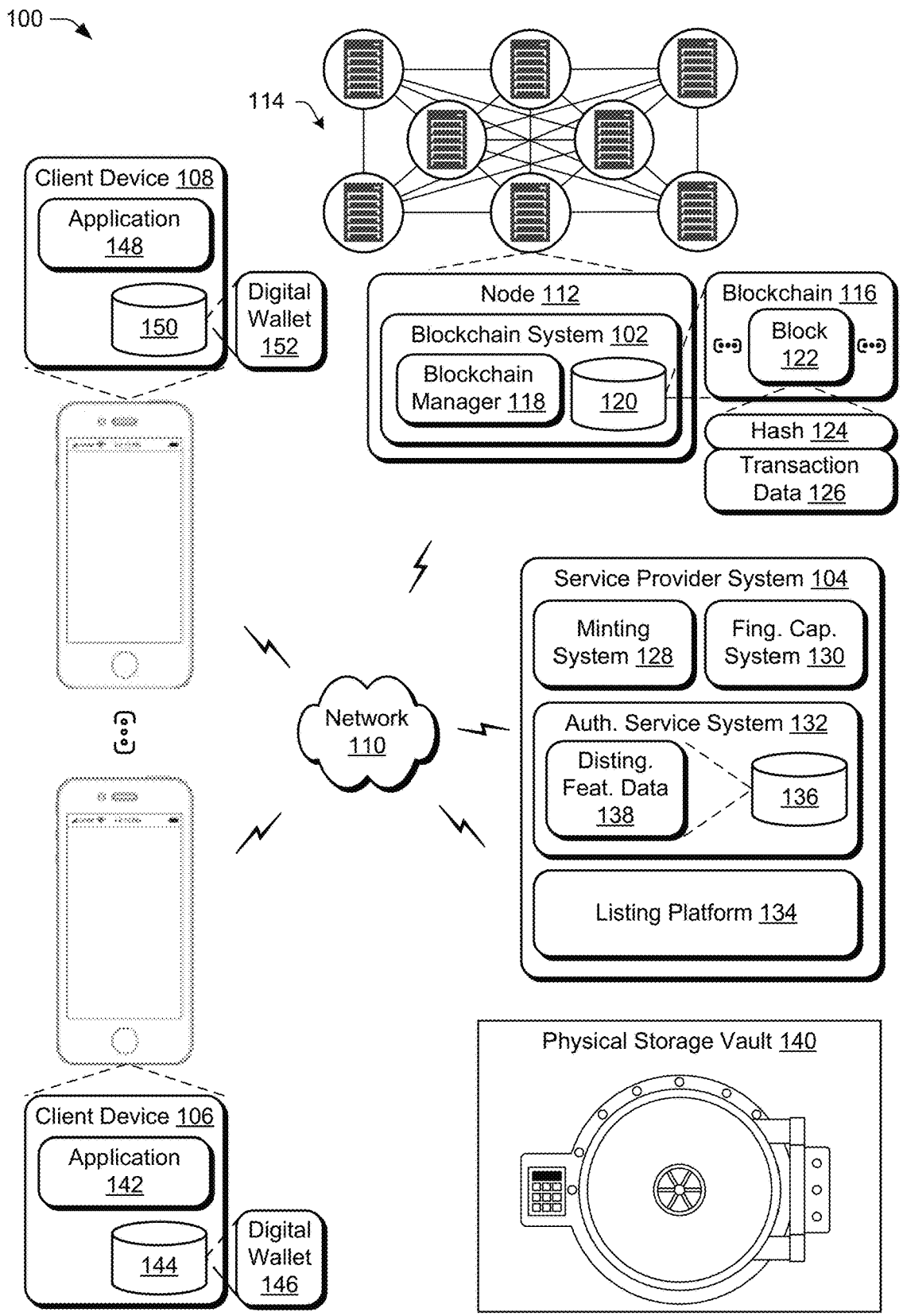
FIG. 1 is an illustration of an environment in an exemplary implementation that is operable to employ techniques described herein.

A physical storage vault for physical items of digital twin NFTs is described. In accordance with the techniques described herein, physical items of digital twin NFTs are stored in a physical storage vault. Initially, a user having a user account obtains a physical item and a digital twin NET of the physical item, such as by minting the digital twin NET of the physical item or by receiving it through a transfer process. For example, the user may obtain the physical item and the digital twin NET via a listing platform, such as an online marketplace. Alternatively or additionally, the listing platform may obtain the physical item and the digital twin NET of the physical item. Based on ownership of the physical item and the digital twin NFT, the listing platform generates a combined listing for the physical item and the digital twin NET of the physical item. This may occur, for example, when an owner of the physical item and the digital twin NFT decides to transfer ownership of the physical item and the digital twin NFT to another user, e.g., in exchange for cryptocurrency. A listing platform may expose this combined listing to various client devices. The listing platform may also expose a selectable option to store the physical item in a physical storage vault, e.g., a selectable button or checkbox of a user interface.

In this way, a buyer that requests ownership of the physical item and the NFT (e.g., in exchange for cryptocurrency), can also request that the physical item of the combined listing be stored in the physical storage vault by selecting the selectable option. In response to this request, the listing platform transfers ownership of the NET to a user account associated with the buyer by encoding metadata of the NET on the blockchain in exchange for the buyer providing a specified amount of cryptocurrency to a user account of the seller. It is to be appreciated that a buyer may request ownership of the physical item and/or the NET in other ways than in exchange solely for cryptocurrency. For instance, other assets may be exchanged separately or in combination with cryptocurrency to request ownership of the physical item and/or the NFT. Examples of other types of currencies and/or assets that may be used in exchanges for physical items and/or NFTs include, for example, fiat money, commodity money, representative money, other physical items or services, other NFTs, points earned with a service provider (e.g., "reward" points), and so forth.

In addition to transferring ownership of the NFT on the blockchain in exchange for cryptocurrency, the listing platform also generates storage instructions which instruct a vault management system to store the physical item of the combined listing in the physical storage vault by either causing the physical item to remain in the physical storage vault or to be transferred to the physical storage vault for storage. For example, if the physical item of the combined listing is already stored in the physical storage vault, then the storage instructions will cause the vault management system to maintain storage of the physical item in the physical storage vault. Alternatively, if the physical item is not currently stored in the physical storage vault, then the storage instructions cause the vault management system to obtain the physical item from the seller and then store the physical item in the physical storage vault.

In this way, buyers are able to obtain an NFT which provides proof of ownership of a physical item, while keeping the physical item safely and securely stored in the physical storage vault. Moreover, at any time the buyer can request possession of the physical item from the physical storage vault, "re-list" the NFT and the physical item on the listing platform, or approve the transfer of the physical item to a different location. For example, if the physical item is a rare trading card or piece of art, the buyer may receive benefits for allowing the physical item to be transferred to another location, such as a museum, event center, and so forth.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a blockchain system 102, a service provider system 104, and a plurality of client devices (represented in the environment 100 by client device 106 and client device 108) that are communicatively coupled, one to another, via a network 110.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch), an AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 6.

In accordance with the described techniques, the blockchain system 102 is implemented by a node 112 of a network 114 (e.g., a distributed network) of the nodes 112. Each of the nodes 112 is a runtime implemented using processing, memory, and network resources of respective computing devices that operate as the infrastructure of a blockchain 116. Here, the blockchain system 102 is illustrated including blockchain manager 118 and storage 120, the storage 120 being an example of a computing resource leveraged to implement the node 112. The blockchain system 102 also includes other resources of the one or more respective computing devices made available for operating as the node 112. Broadly, the blockchain manager 118 is configured to leverage those resources to implement the node 112 on behalf of the one or more computing devices.

By way of example, the blockchain manager 118 manages the storage 120 of the one or more computing devices implementing the node 112, such as by causing a copy of the blockchain 116 to be maintained in the storage 120. The copy of the blockchain 116 stored at the storage 120 may be a partial or full copy of the blockchain 116, depending on one or more characteristics of the node 112 (e.g., a type) and/or a time (e.g., whether updates have been made to the blockchain 116 via other nodes 112 in the network 114). The blockchain manager 118 may manage other resources of those computing devices in connection with operation of the blockchain 116, such as memory and processors of those devices to perform computations (e.g., transaction validation), operating systems of those devices, and network connections of those devices (e.g., to commit changes to the blockchain 116 and to receive updates to the node 112's copy of the blockchain), to name just a few. In short, the nodes 112 store, communicate, process, and manage data that makes up the blockchain 116. As illustrated in FIG. 1, the nodes 112 are interconnected to exchange data via the network 110, e.g., as a peer-to-peer network in a distributed and decentralized manner.

Broadly speaking, the blockchain 116 is formed using a plurality of blocks 122, illustrated in FIG. 1 as including a respective hash 124 and transaction data 126. The transaction data 126 of the blocks 122 includes batches of validated transactions that are hashed and encoded. Each of the blocks 122 includes the hash 124, which is a cryptographic hash of a previous block 122 in the blockchain 116, thereby linking the blocks 122 to each other to form the blockchain 116. As a result, the blocks 122 cannot be altered retroactively without altering each subsequent block 122 in the blockchain 116 and in this way protecting against attacks by malicious parties.

In order to publish the blocks 122 for addition to the blockchain 116, a node 112 may be implemented as a "miner" to add a block of transactions to the blockchain 116. In one or more implementations, other nodes may communicate transactions received at those nodes to one or more mining nodes for validation. Mining nodes may perform peer-to-peer computations to check if transactions intended for the blockchain 116 are valid and, if validated, may add validated transactions to a block 122 that those nodes are building. If the transactions are determined to be valid, for instance, then the transaction data 126 describing those transactions is encoded in or otherwise stored on a respective block 122, which is linked to the blockchain 116 such that the new block is "at the end" or "at the top" of the blockchain 116, e.g., through inclusion of the hash 124 of a previous block in the chain.

The nodes 112 then broadcast this transaction history via the network 110 for sharing with other nodes 112. This acts to synchronize the blocks 122 of the blockchain 116 across the distributed architecture of computing devices. A variety of "types" of nodes 112 may be used to implement the blockchain 116. By way of example, the blockchain 116 may be implemented at least in part using "full" nodes, which are nodes that store an entirety of the blockchain 116, e.g., locally in computer-readable storage media of respective computing devices of the nodes 112. Other types of nodes may also be employed to implement additional functionality to govern voting events, execution of protocol operations, rules enforcement, and so forth.

The blockchain 116 may be leveraged to provide a diverse range of functionality. Due in part to the distributed storage and updating of the blockchain 116 over the network 114 of nodes 112, the blockchain 116 may store its data in a decentralized manner, without a centralized database (e.g., run by a clearinghouse), and thus operate as a distributed ledger. The decentralized storage of the blockchain 116 overcomes one of the major disadvantages of centralized storage, which is that centralized storage essentially has a single point of failure. It is to be appreciated that in one or more implementations, the blockchain 116 may be public (e.g., like Ethereum and Bitcoin blockchains), such that transactions on the blockchain 116 are generally viewable with a connection to the Internet. Alternatively, the blockchain 116 may be configured as a private blockchain, in one or more implementations. When the blockchain 116 is a "private" blockchain, the computing devices used to implement the nodes 112 may be controlled by a centralized authority, such as a company or a consortium of entities.

As a distributed ledger, the blockchain 116 supports the secure transfer of digital assets, such as the transfer of a cryptocurrency and/or tokens. Broadly speaking, cryptocurrencies (e.g., coins of the cryptocurrency) are the native assets to blockchains, whereas tokens are created "on top" of these blockchains. Tokens may be created "on top" of the blockchain 116 by using a "token standard" which allows the token to interoperate with the blockchain 116's network of nodes 112 according to one or more protocols of the blockchain, such that the transaction data 126 and the hashes 124 of the blocks 122 are leveraged to create, trade, and update tokens. By way of example, the Ethereum blockchain's native asset is ether (ETH), a cryptocurrency. Nevertheless, tokens may be created on top of Ethereum's blockchain by using one or more of Ethereum's token standards for creating tokens, such as by using ERC-20, ERC-721, ERC-1155, and EIP-2309, to name just a few.

Regardless of the particular blockchain protocol(s) and features used, the tokens created on top of the blockchain 116 may be "programmable," meaning that they run on software protocols and can be configured to include logic executed by computing resources (e.g., of the nodes 112). This enables the tokens to implement smart contracts that define conditions for the token and the network 114's rules of engagement. Broadly, a "smart contract" is self-executing code that carries out a set of instructions in accordance with terms of the contract, and this carrying out of the set of instructions is then validated by the blockchain 116. For instance, the self-executed code is sent to an address on the blockchain 116 as a blockchain transaction and, at the address, the code sent is validated, e.g., by a consensus mechanism of the blockchain 116. Once validated, this transaction may be included in a block 122, such that the smart contract is initiated and irrevocable.

In addition or alternatively, tokens, implemented according to a token standard (e.g., ERC-721 or ERC-1155) and by leveraging the architecture and protocols of the blockchain 116, can be programmatically encoded as non-fungible assets that are individually unique and cannot be directly interchanged with other similar tokens "like-for-like". In accordance with the described techniques, for instance, the architecture and protocols of the blockchain 116 can be leveraged to create non-fungible tokens (NFTs) on the blockchain 116. By using the transaction validation carried out by the nodes 112, the blockchain 116 certifies that a given NFT is digitally unique and thus not interchangeable with other NFTs. When an NET is minted (i.e., programmatically brought into existence), the blockchain 116's protocols generate a unique token identifier that is encoded in the NFT—the unique identifier may be generated using one or more randomization approaches. As used herein, the term "non-fungible" refers to the property of a token to uniquely represent an asset, such that a digital signature of the token represents the underlying asset in a way that is not directly interchangeable with (e.g., "like-for-like"), or equal to, any other tokens. This contrasts with cryptocurrencies, which are "fungible" because two coins of a same cryptocurrency (e.g., two Ether or two Bitcoins) can be traded or exchanged for one another and are of equal value.

Instead, each NFT is programmatically created to include a unique, non-transferable identity which distinguishes it from other NFTs. In one or more implementations, an NET may encode underlying digital content, e.g., underlying digital art, an image, music, a video, in-game content, text (e.g., a story or writing), a composition of multiple types of digital media, a file, or a 3D-model, to name just a few. Alternatively or additionally, an NET may encode an association with or to the digital content, e.g., a uniform resource locator (URL) or other location information that describes a location where the digital content and/or data about the digital content is stored. In one or more examples, for instance, rather than encoding the digital content for storage in the NFT, the digital content may be stored in third-party storage, e.g., storage of the service provider system 104 or storage of another service provider. As discussed above and below, an NET created and maintained on the blockchain 116 is configured to encode other information in addition to underlying digital content, or an association with the underlying digital content.

In accordance with the described techniques, the service provider system 104 includes a variety of functionality for creating NFTs and executing transactions involving NFTs, e.g., listing NFTs for sale, purchasing NFTs, easily creating smart contracts with different terms (e.g., royalties and/or fractional ownership structures and rules) to govern transactions involving an NET, initiating execution of smart contracts encoded by NFTs, and so forth. As illustrated herein, the service provider system 104 includes a minting system 128, a fingerprint capture system 130, an authentication service system 132, and listing platform 134. The authentication service system 132 is depicted having storage 136 which stores distinguishing feature data 138, which the authentication service system 132 uses to authenticate physical items, including physical items for which digital twinned NFTs are created as discussed above and below.

It is to be appreciated that the service provider system 104 may include more, fewer, and/or different components than illustrated without departing from the spirit or scope of the described techniques. Additionally, portions or entireties of one or more of the components may be implemented at client devices, such as part of applications at the client device 106 and/or the client device 108. For instance, at least a portion of the fingerprint capture system 130 (or the other illustrated components) may be implemented at the client devices 106, 108, e.g., as at least part of an application, as a plug-in, via a web page output (e.g., displayed) by the client devices, and so on.

The illustrated environment 100 also includes physical storage vault 140, which may be utilized in one or more implementations, e.g., to store physical items having digital twinned NFTs for safe keeping. The physical storage vault 140 may be included as part of the service provider system 104 or may be controlled by a third party and simply associated with or otherwise accessible to the service provider system 104.

To enable respective users to initiate operations to create NFTs and to perform transactions involving NFTs, the client device 106 and the client device 108 include components to interact within the environment 100. The client device 106 is illustrated including application 142 (e.g., a computer application) and storage 144, which is depicted storing digital wallet 146. The client device 108 is illustrated including application 148 (e.g., a computer application) and storage 150, which is depicted storing digital wallet 152. The applications 142, 148 may be configured in a variety of ways in accordance with the described techniques. For example, the applications 142, 148 may be mobile applications, plug-ins, or web-browsers to access web pages providing NFT-based services, to name just a few. The applications 142, 148 may be separate installations of a same application, e.g., a mobile application of the service provider system 104. Alternatively or additionally, the applications 142, 148 may correspond to a digital wallet service provider (not shown), which provides respective digital wallets 146, 152. Alternatively or in addition, the digital wallets 146, 152 may be accessible to the respective applications 142, 148, e.g., via an application programming interface (API), to carry out operations involving NFTs on the blockchain 116.

By way of example, the respective applications 142, 148 may receive user input via a user interface to initiate ownership transfer of an NET from a user associated with the client device 106 to a user associated with the client device 108, e.g., by transferring the NFT from the digital wallet 146 to the digital wallet 152. The digital wallets 146, 152 may store public and private cryptographic keys that are used to digitally link transactions on the blockchain 116 to user accounts corresponding to the wallets. Generally, the information stored on the wallets may point to assets' locations in terms of blocks on the blockchain and there is a unique cryptographic address issued by a wallet, such that the transaction data 126 encodes wallet addresses of parties to the transaction.

Returning to the components of the service provider system 104, the minting system 128 is configured to "mint" NFTs. To mint an NET, the minting system 128 causes the NFT to be created on the blockchain 116 and programmatically encodes an association of metadata with the NET. In accordance with the described techniques, for example, the minting system 128 is configured to mint digital twin NFTs of physical items. The metadata for a digital twin NET may include a fingerprint of the physical item (e.g., a high-resolution image of one or more features of the item, a LIDAR scan of the physical item, a unique serial number engraved on the item, etc.) and digital content of the physical item (e.g., an image of the physical item for presentation, a video of the physical item, and/or a 3D model of the physical item). The metadata may also include other information, such as a digital record of traits of the physical item, a description of the item, a condition of the physical item (which can change over time), an indication that the physical item is an authentic physical item, item authenticity and owner verification records, an indication that the physical item is not an authentic physical item, a physical location where the item was minted (e.g., at a residence, at a location corresponding to a facility of the service provider system, at an event such as a concert or sporting event, and so on), locations of transactions involving the physical item, public addresses of wallets of owners of the NFT, and/or a current location of the physical item, to name just a few. In scenarios where the metadata includes an indication that the physical item is not an authentic physical item, the physical item may be a replica or an imitation of an authentic physical item, examples of which include a print of an original painting or other artwork and a replica jersey, to name just a few. In one or more implementations, information, or portions of the information, encoded into a digital twin NET may be based on user input to enter the information, e.g., via a user interface of the service provider system 104 in connection with listing the item.

The minting system 128 may encode an association of this metadata with the digital twin NET by, for example, encoding the actual data (e.g., the unique fingerprint and/or the digital content) in the digital twin NFT, encoding unique identifiers of the actual data in the digital twin NET, and/or encoding one or more addresses where such data is located (e.g., a storage location) in the digital twin NET. In operation, the minting system 128 provides data as specified by a token standard associated with the blockchain 116 to one or more of the nodes 112 to mint a new digital twin NFT of a physical item. For example, the minting system 128 packages and communicates the actual metadata to be encoded and/or packages and communicates the association (e.g., identifier and/or addresses) to be encoded according to the token standard to the one or more nodes 112.

The fingerprint capture system 130 is configured to generate digital fingerprints of physical items that uniquely identify a given physical item from other physical items. The fingerprint capture system 130 generates those fingerprints based on captured features of the physical items, such as features captured using sensors of one or more devices. As discussed below, the features may be captured using one or more sensors of client devices (e.g., the client devices 106, 108), one or more sensors of the fingerprint capture system 130 (e.g., when configured with hardware to capture the features of physical devices), and/or sensors of other devices. By way of example, the client devices and/or the fingerprint capture system 130 may include a high-resolution digital camera to capture high-resolution digital image features of physical items.

The authentication service system 132 is configured to verify whether a physical item corresponds to an authentic physical item. The authentication service system 132 may verify whether a physical item corresponds to an authentic physical item by matching the fingerprint of a physical item, as generated by the fingerprint capture system 130, to distinguishing feature data 138 of a known authentic physical item. The authentication service system 132 may do so by comparing a fingerprint, or captured features encoded in the fingerprint, to portions of the distinguishing feature data 138, e.g., searching the distinguishing feature data 138 for data having at least a threshold similarity to the fingerprint or portions of the fingerprint. The authentication service system 132 may then return a response indicating that a physical item is or is not an authentic physical item (or is unsure whether the physical item is or is not authentic) based on whether the fingerprint matches any of the distinguishing feature data 138.

The listing platform 134 is configured to generate listings for items and to expose those listings (e.g., publish them) to one or more client devices, such as via an online marketplace. For example, the listing platform 134 may generate listings for items for sale and expose those listings to client devices, such that the users of the client devices can interact with the listings via user interfaces to initiate transactions (e.g., purchases, add to wish lists, share, and so on) in relation to the respective item or items of the listings. In accordance with the described techniques, the listing platform 134 is configured to generate listings for physical items or property (e.g., collectibles, luxury items, clothing, electronics, real property, physical computer-readable storage having one or more video games stored thereon, and so on), services (e.g., babysitting, dog walking, house cleaning, and so on), digital items (e.g., digital images, digital music, digital videos) that can be downloaded via the network 110, and NFTs, to name just a few. Notably, the listing platform 134 is configured to generate a combined listing that includes both a physical item and a digital twin NFT of the physical item. The listing platform 134 may generate the combined listing, which lists both the physical item and the digital twin NFT, based on user input received from a client device associated with a user account (e.g., of the listing platform 134) and received via a user interface to generate the combined listing. For example, the service provider system 104 may initiate the minting of a digital twin NFT of a physical item and initiate the listing of both the physical item and the digital twin NFT responsive to receiving such user input via a user interface of the application 142, 148, as output at the client device 106 or the client device 108.

Optionally, the service provider system 104 may store physical items at the physical storage vault 140, such as valuable physical items having digital twin NFTs. Storage of the underlying physical item at the physical storage vault 140 allows ownership of the digital twin NFT and the physical item to be easily transferred between owners without the hassle of physically moving the item to transfer possession, e.g., shipping the item or exchanging it between hands. Instead, the item may be transferred to the physical storage vault 140 for storage and remain in the physical storage vault 140 while ownership of the physical item and/or its digital twin NFT is transferred a number of times. The physical storage vault 140 may also maintain physical items where ownership is divided, using a digital twin NFT, into a number of fractions of ownership of the physical item, e.g., "shares" of the physical item issued according to terms of the digital twin NFT.

Having considered an example of an environment, consider now a discussion of some examples of details of the techniques for a physical storage vault for physical items of digital twin NFTs in accordance with one or more implementations.

Physical Storage Vault for Physical Items of Digital Twin NFTs

Figure 2:
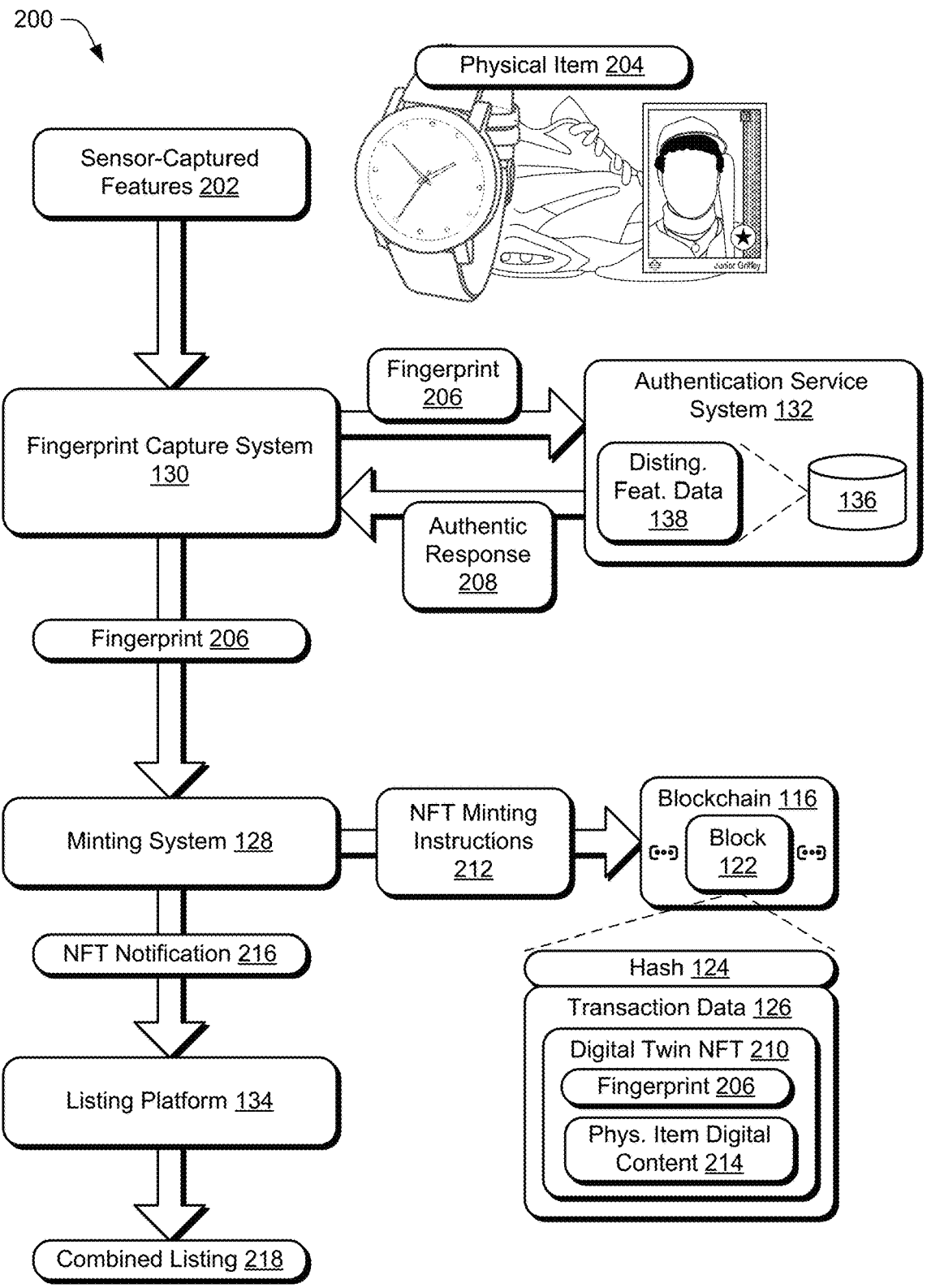
FIG. 2 depicts an example of a system to fingerprint physical items to mint NFTs.

FIG. 2 depicts an example 200 of a system to fingerprint physical items to mint NFTs. The illustrated example 200 includes from FIG. 1 the fingerprint capture system 130, the authentication service system 132, the minting system 128, and the listing platform 134. The illustrated example 200 also includes the blockchain 116.

In this example 200, the fingerprint capture system 130 is depicted obtaining sensor-captured features 202 of physical item 204. The illustrated examples of the physical item 204 include a luxury item (e.g., a watch), sneakers, and a trading card (e.g., a baseball card). It is to be appreciated, however, that the physical item 204 may correspond to a variety of physical items without departing from the spirit or scope of the described techniques, including, for example, home and garden items, fashion items, automotive items, other collectibles, electronics, sporting goods, toys, and business and industrial items, to name just a few.

In accordance with the described techniques the sensor-captured features 202 correspond to data describing one or more aspects of the physical item 204 and may include various information captured about the physical item 204, e.g., using sensors of one or more devices. For instance, this information may be generated about the physical item 204 using one or more sensors of the client device 106, the client device 108, and/or one or more sensors of the fingerprint capture system 130 when the fingerprint capture system 130 includes sensors to capture features of physical items.

By way of example, the fingerprint capture system 130 may be implemented at least partially at a client device (e.g., a client device 106, 108) having the one or more sensors. Alternatively or in addition, the fingerprint capture system 130 may be configured as or include a receptable into which, or a platform onto which, physical items may be placed so that sensors of the fingerprint capture system 130 can scan the item to generate the sensor-captured features 202.

Examples of sensors that may be used to generate the sensor-captured features 202 include, but are not limited to, imaging sensors (e.g., one or more high-resolution digital cameras, one or more low-resolution digital cameras), temperature sensors, LIDAR, biochemical sensors, and so on. Examples of the sensor-captured features 202 may include, but are not limited to, images (e.g., high-resolution images of the physical item 204's features), videos of the physical item 204, data derived from various electromagnetic spectrum features captured by the sensors about the physical item 204, measured temperatures at different locations of the physical item 204 (or a map of them), a LIDAR scan of the physical item 204, or measurements (or estimated values) of one or more elements or compounds at different locations of the physical item 204, to name just a few. It is to be appreciated that the sensor-captured features 202 may be produced by a variety of sensors of different devices and describe a variety of features about the physical item 204 without departing from the spirit or scope of the techniques described herein.

Based on the sensor-captured features 202, the fingerprint capture system 130 generates a fingerprint 206 of the physical item 204. The fingerprint 206 is unique to the physical item 204 and may be used to uniquely identify the physical item 204 from other physical items, including from another specimen of the same item (e.g., two luxury watches of the same brand, make, model, etc.). For example, the fingerprint 206 may be configured as a unique digital signature that identifies the physical item 204 from other physical items. Notably, the fingerprint capture system 130 can generate the fingerprint 206 to digitally encode the sensor-captured features 202 of the physical item 204 at various points in time after manufacture of the physical item 204. In other words, the fingerprint capture system 130 is not reliant on the manufacturing process to generate the fingerprint 206 so that it uniquely identifies the physical item 204. In this way, the fingerprint capture system 130 is configured to generate the fingerprint 206 without modifying the physical item 204. This contrasts with techniques that rely on an identifier to be manufactured into or otherwise incorporated with the physical item 204, examples of which include configuring a physical item with an RFID tag and/or applying (e.g., stitching in or printing) an identifier to the physical item.

In accordance with the described techniques, the authentication service system 132 is configured to authenticate the physical item 204 based on the fingerprint 206. Here, the authentication service system 132 is depicted obtaining the fingerprint 206 from the fingerprint capture system 130. The fingerprint capture system 130 may transmit the fingerprint 206 to the authentication service system 132 for authentication, in accordance with the described techniques. As noted above, for instance, the fingerprint capture system 130 may be implemented at least in part at a client device, e.g., as part of the application 142 at the client device 106 and/or as part of the application 148 at the client device 108. Thus, one of the client devices 106, 108 may transmit the fingerprint 206 to the authentication service system 132 over the network 110.

Broadly, the authentication service system 132 verifies that the physical item 204 corresponds to an authentic physical item. To do so, the authentication service system 132 compares the fingerprint 206 to the distinguishing feature data 138 stored in the storage 136. The distinguishing feature data 138 describes features of one or more physical items that are known to be authentic and is saved in the storage 136. The authentication service system 132 is capable through a computerized comparison of the digital fingerprint 206 and the distinguishing feature data 138 of identifying those authentic items and/or differentiating them from items that are not authentic (e.g., knockoffs). Some of the comparison techniques used by the authentication service system 132 may not be possible by humans because humans do not have the sensory capacity to detect one or more of the same features and/or compare digital fingerprints to the distinguishing feature data 138 at the level required to identify a physical item as authentic.

If the authentication service system 132 determines that there is a match between the fingerprint 206 and the distinguishing feature data 138, then the authentication service system 132 determines that the physical item 204 is an authentic physical item. If the authentication service system 132 does not determine that there is a match between the fingerprint 206 and the distinguishing feature data 138, however, then the authentication service system 132 may determine that the physical item 204 is not an authentic physical item. In one or more implementations, the authentication service system 132 may determine that there is a match between the fingerprint 206 and the distinguishing feature data 138 based on identifying a threshold similarity between the fingerprint 206 and the respective distinguishing feature data 138. In this way, a physical item that is not identical to a known authentic item, but is "close enough" to have a high likelihood of being authentic, may be determined authentic by the authentication service system 132, such that the physical item 204 is considered a "match" to authentic physical items.

Based on matching the fingerprint 206 to data in the distinguishing feature data 138, the authentication service system 132 provides an authentic response 208, indicating that the physical item 204 is an authentic physical item. In the illustrated example 200, for instance, the authentication service system 132 communicates the authentic response 208 to the fingerprint capture system 130, although it is to be appreciated that the authentic response 208 may be communicated to and thus received by the service provider system 104 and any modules thereof. In the scenario where the authentication service system 132 does not find a suitable match between the fingerprint 206 and the distinguishing feature data 138, the authentication service system 132 may determine that the physical item 204 is not authentic and may communicate a response indicating that the physical item 204 is not authentic, e.g., to the fingerprint capture system 130 or to another component.

The minting system 128 obtains the fingerprint 206, such as from the fingerprint capture system 130 as depicted. Receipt of the fingerprint 206 by the minting system 128 may be responsive to the authentic response 208 indicating that the physical item 204 is an authentic physical item. In one or more scenarios, however, the minting system 128 may receive the fingerprint 206 for an item that is determined not to be authentic by the authentication service system 132.

In accordance with the described techniques, the minting system 128 is configured to cause a digital twin NFT 210 of the physical item 204 to be minted on the blockchain 116. To do so, the minting system 128 may provide NFT minting instructions 212, e.g., to one or more of the nodes 112 in the network 114 of nodes. The NFT minting instructions 212 may be configured according to and include data specified by a token standard, e.g., ERC-721 or ERC-1155, for creating the digital twin NFT 210. Once created, the digital twin NFT 210 has a unique token identifier that uniquely identifies the token from other tokens—the token identifier may be a unit 256 variable, for instance. In accordance with the described techniques, the information included in the NFT minting instructions 212 enables a node 112 to programmatically encode in the digital twin NFT 210 information provided or indicated in the NFT minting instructions 212. For example, the NFT minting instructions 212 may include an association with metadata, such as an association with the fingerprint 206 and physical item digital content 214. The node 112 receiving those instructions may thus encode the association with the metadata into the digital twin NFT 210.

Here, the digital twin NFT 210 is depicted including the fingerprint 206 and the physical item digital content 214. It is to be appreciated that in one or more implementations, however, the digital twin NFT 210 may include references to the fingerprint 206 and the physical item digital content 214 instead of the actual content. Such references may be configured as pointers to the actual content (e.g., URLs or storage locations) and/or unique identifiers (e.g., GUID) of the actual content. By encoding associations with the actual content rather than encoding the actual digital content (e.g., the fingerprint 206 and/or the physical item digital content 214), the minting system 128 may limit the use of hardware resources (e.g., processing) of the nodes 112 for minting the digital twin NFT 210. By limiting an amount of resources used, the minting system 128 may proportionally reduce a "gas" fee required by the blockchain 116 to utilize those resources and mint the digital twin NFT 210.

As noted above, the digital twin NFT 210 may also programmatically encode other information. For example, the digital twin NFT 210 may programmatically encode a public address of a digital wallet of a user associated with minting the NFT, e.g., a public address of the digital wallet 146 in a scenario where a user associated with the client device 106 provides user input via a user interface to mint the digital twin NFT 210. The digital twin NFT 210 may also be configured to digitally record a provenance of the NFT, such that ownership information is captured each time the digital twin NFT 210 is transferred (in whole or in part). For example, if the minting user transfers the digital twin NFT 210 to a new user, then the transfer from the wallet address of the minting user to a wallet address of the new user is recorded in the digital twin NFT 210's data on the blockchain 116. As with other transactions on the blockchain 116, one or more of the nodes 112 validates such a transfer so that only valid transfers are committed to the blockchain 116.

The digital twin NFT 210 may be minted to encode other data, examples of which include smart contracts (e.g., to govern royalties, fractional ownership processes and events, end-of-life of the NFT events, and so forth), description of other aspects of the physical item 204 (e.g., a condition of the physical item 204, provenance of different parts of the physical item 204, maintenance record of the physical item 204, and so forth). The digital twin NET 210 may also be minted to encode various metadata, such as a description of the physical item 204, a condition of the physical item 204 (which can change over time), an indication that the physical item 204 is an authentic physical item, an indication that the physical item 204 is not an authentic physical item, a physical location where the physical item 204 was minted (e.g., at a residence, at a location corresponding to a facility of the service provider system, at an event such as a concert or sporting event, and so on), locations of transactions involving the physical item 204, and/or a current location of the physical item 204, to name just a few.

With regard to a physical item's condition, the service provider system 104 may be configured to determine a condition of a physical item and capture the determined condition as a state in the digital twin NFT 210 or other data associated with the physical item 204. In one or more implementations, the service provider system 104 may be configured to determine a condition of the physical item 204 using the sensor-captured features 202. The service provider system 104 may further be configured to generate or set metadata (e.g., a state) describing the determined condition of the physical item 204. To this end, the minting system 128 may also cause an association with metadata describing the condition of the physical item 204 to be encoded in the digital twin NFT 210, i.e., in addition to encoding the association with the fingerprint 206.

In this way, a condition of the physical item 204 may be encoded separately from data that uniquely identifies the physical item 204 from other physical items, e.g., separately from the fingerprint 206. Due to this separate determination and encoding, the condition encoded by the digital twin NET 210 may change over time, but the fingerprint 206 of the item does not change over time. By way of example, the digital twin NFT 210 may encode an association with metadata that describes a condition of the item in terms of "new" or "used," an amount the item is used, a relative amount of use compared to other items, an age of the item, and/or changes to the item from one or more previous times features of the item were captured, to name just a few. Consider a scenario, after the digital twin NFT 210 is minted, in which additional features of the physical item 204 are captured e.g., by sensors of one or more devices. The service provider system 104 is configured to compare the newly captured features to the sensor-captured features 202 used in connection with minting the digital twin NFT 210. Based on this comparison, the service provider system 104 may determine that the condition of the physical item 204 has changed subsequent to minting the digital twin NFT 210. Based on determining that the condition of the physical item 204 has changed over time, the service provider system 104 may update the metadata of the digital twin NFT 210 to indicate the changed condition of the physical item 204. It is to be appreciated that the digital twin NFT 210 may encode a variety of information in relation to the physical item 204 as discussed above and below.

In this example 200, the listing platform 134 is depicted receiving NET notification 216. The NET notification 216 may describe a location of the digital twin NFT 210 on the blockchain 116. For example, the NET notification 216 may include the token identifier of the digital twin NET 210 and/or an address of a digital wallet of a current owner of the digital twin NET 210. Additionally or alternatively, the NFT notification 216 may indicate that the digital twin NFT 210 is to be listed by the listing platform 134 along with the physical item 204. The NFT notification 216 may be received responsive to receiving a user request to generate a combined listing for the physical item 204 and the digital twin NFT 210. Alternatively or additionally, the NFT notification 216 may be automatically received by the listing platform 134 responsive to the digital twin NFT 210 being minted on the blockchain 116.

In accordance with the described techniques, the listing platform 134 generates a combined listing 218, which lists both the physical item 204 and the digital twin NFT 210 together. For example, the combined listing 218 may list the combination of the physical item 204 and the digital twin NFT 210 for sale together via the listing platform 134. In the illustrated example 200 the listing platform 134 is depicted outputting the combined listing 218. This output of the combined listing 218 may correspond to publishing the combined listing 218 to one or more client devices, e.g., associated with user accounts of the service provider system 104 or that navigate to user interfaces of the service provider system 104. By way of example, the combined listing 218 may be displayed or otherwise output by a web application (e.g., the application 142 or the application 148) via a user interface at the client devices 106, 108. In one or more implementations, the listing platform 134 may expose the combined listing 218 to a plurality of client devices, such that users navigating to the listing or searching for listings can view the combined listing 218.

In one or more implementations, the authentication service system 132 and/or the minting system 128 may be used to determine whether the physical item 204 is authentic and to cause the digital twin NFT 210 to be minted after a transaction for the physical item 204, e.g., after the physical item 204 has been sold via the listing platform 134. For example, a first user account (e.g., of a selling user) may cause the physical item 204 to be listed via the listing platform 134, such as based on user input of the selling user to provide information (e.g., a description, title, images, videos, and so on) about the physical item 204 and to select a user interface component (e.g., a button) to cause the listing platform. 134 to generate a listing for the physical item 204 and then publish the listing. In this example, a second user account (e.g., of a buying user) may then interact with the published listing (e.g., with one or more user interface components of the listing) and thereby select to buy or otherwise initiate a process to obtain the physical item 204 based on the interactions with those interface components.

Further in this example, after the second user account buys or otherwise initiates the process to obtain the physical item 204, it may be authenticated using the authentication service system 132 and the digital twin NFT 210 may be created or simply updated using the minting system 128. In this way, a service provider system, like the listing platform 134, may conserve resources by waiting to deploy the authentication service system 132 and/or the minting system 128 when transactions for physical items have actually occurred, and not until one has. It is to be appreciated, however, that these systems may be used at other times associated with transactions for physical items without departing from the spirit or scope of the described techniques, such as prior to generating and publishing a listing for a physical item, as discussed in more detail above.

As also mentioned above, the minting system 128 can mint NFTs so that they encode smart contracts with various terms (e.g., royalties and/or fractional ownership structures and rules) to govern transactions involving an NET, to initiate execution of smart contracts encoded by NFTs, and so forth. In connection with use of the minting system 128, after a transaction (e.g., sale) has occurred, the minting system 128 can also encode such smart contracts into those NFTs. In addition to smart contracts, the minting system 128 can cause other features of, or associated with, the physical item 204 to be encoded in the digital twin NFT 210. By way of example, the minting system 128 can encode in the digital twin NET 210 one or more of visual data (e.g., images, videos, and/or references to visual data) of the physical item 204, data derived from such visual data, data describing a location of the physical item 204 at different times (e.g., at a timestamp), maintenance data, data describing updates or upgrades of the item (e.g., addition of new, upgraded, or downgraded parts), authenticity data (e.g., indicating whether the physical item 204 an authentic physical item), vintage data, and tampering data, to name just a few.

In one or more implementations, the minting system 128 causes the digital twin NET 210 to encode features received based on user input of the listing user account (e.g., the selling user account) in connection with generating a listing for the physical item 204 on the listing platform 134. The user-input features which the minting system 128 can encode in the digital twin NFT 210 include, for example, a description of the item, one or more categories corresponding to the item, sale price, condition, shipping information, information about the owner, and so forth. In this way, the digital twin NFT 210 may encode a variety of information about the physical item 204. Additionally, each time the digital twin NFT 210 is transferred to a different owner, e.g., responsive to the transfer to different digital wallet addresses, transfer information is also encoded in the digital twin NFT 210. Moreover, in scenarios where the digital twin NET 210 encodes a smart contract, the nodes 112 of the blockchain 116 can execute the smart contract in connection with a transfer, e.g., to pay royalties to one or more entities specified by the smart contract. The nodes 112 of the blockchain 116 can then automatically update the smart contract encoded in the NET to persist a record of the transaction. Additionally or alternatively, the minting system 128 can encode additional identifying information into the digital twin NET 210, such as a serial number of the physical item 204 which may be part of or otherwise applied to the item, a QR code applied to the item (e.g., in connection with the authentication service system 132 determining that the physical item 204 is authentic), and so on.

Figure 3:
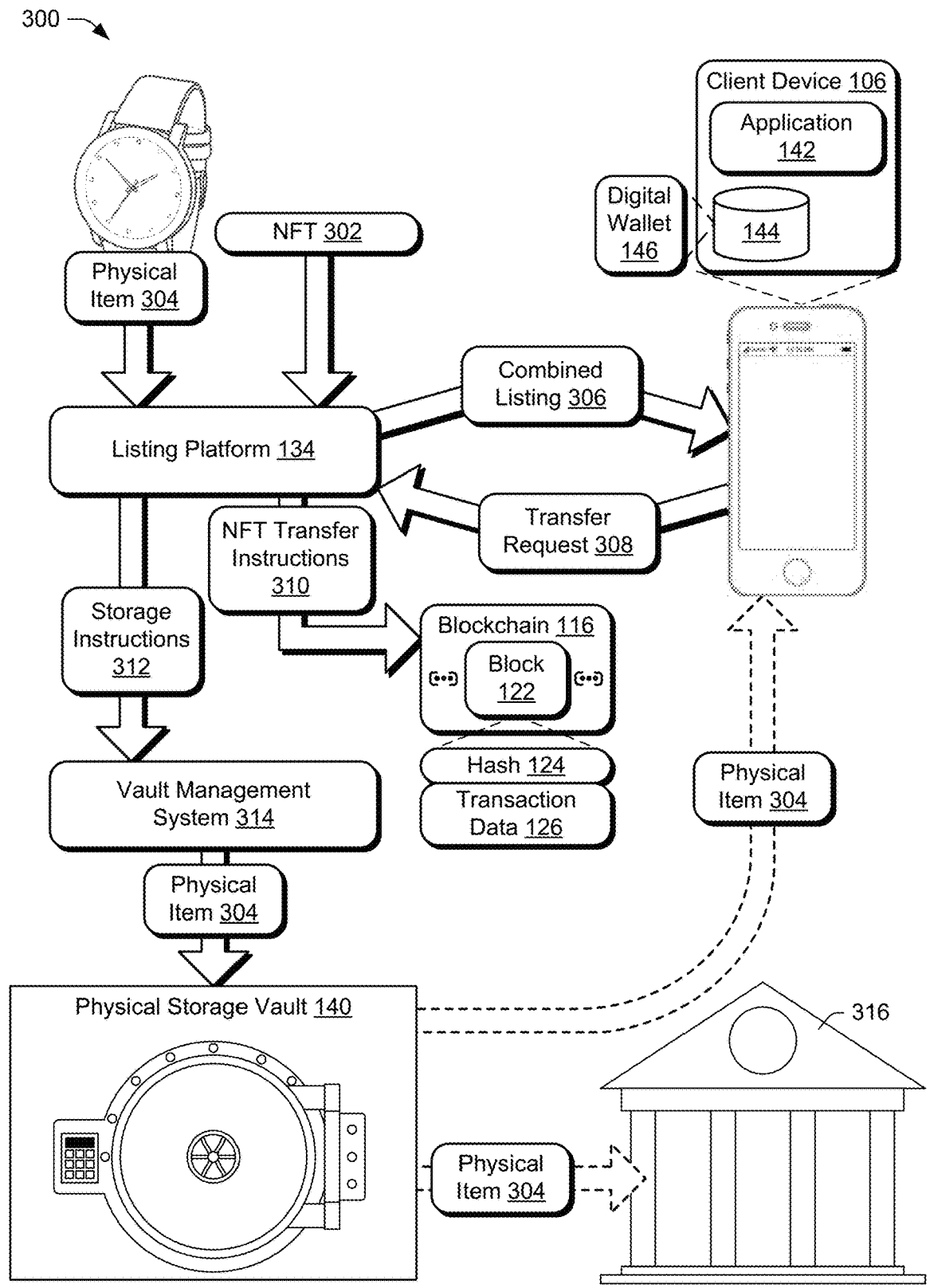
FIG. 3 depicts an example of a system to control a physical storage vault to store physical items of digital twin NFTs.

FIG. 3 depicts an example 300 of a system to control a physical storage vault to store physical items of digital twin NFTs. The illustrated example 300 includes from FIG. 1 the client device 106, the listing platform 134, the blockchain 116, and the physical storage vault 140.

In this example 300, the listing platform 134 is depicted obtaining NFT 302 of physical item 304 and the physical item 304. In accordance with the described techniques, the listing platform 134 is configured to generate a combined listing 306, which lists both the physical item 304 and the NFT 302 together. For example, the combined listing 306 may list the combination of the physical item 304 and the NFT 302 for transfer (e.g., sale or auction) together via the listing platform 134. In the illustrated example 300, the listing platform is depicted outputting the combined listing 306. This output of the combined listing 306 may correspond to publishing the combined listing 306 to a plurality of client devices, including the client device 106 as depicted. By way of example, the combined listing 306 may be displayed or otherwise output by a web application (e.g., the application 142) via a user interface at the client device 106. In one or more implementations, the listing platform 134 may expose the combined listing 306 to a plurality of client devices, such that users navigating to the listing or searching for listings can view the combined listing 306. It is to be appreciated that in one or more implementations, the listing platform 134 may not actually obtain the physical item 304 and the NFT 302. Instead, the listing platform 134 may obtain an indication that the physical item 304 and the NFT 302 are to be listed via the platform. In one or more implementations, the listing platform 134 may verify that the NFT 302 is owned by a user account listing the NFT 302, e.g., by verifying that a public address encoded in the NFT 302 as address of the owner corresponds to the user account of the NFT 302.

Here, the NFT 302 may be a digital twin NFT of the physical item 304. For example, the NFT 302 may correspond to the digital twin NFT 210 and the physical item 304 may correspond to the physical item 204. In this way, the NFT 302 may encode an association with a fingerprint of the physical item 304 and/or digital content of the physical item 304. It is to be appreciated, however, that the NFT 302 may be configured differently from the digital twin NFT 210 without departing from the spirit or scope of the described techniques. For instance, the NET 302 may not include a fingerprint of the physical item 304, in one or more implementations. The NFT 302 may differ from the digital twin NET 210 in other ways within the scope of the described techniques.

The client device 106 is configured to output the combined listing 306 via a user interface, e.g., by displaying the combined listing 306 via the user interface. As depicted in more detail in the examples below, the user interface outputting the combined listing 306 includes an option that is selectable to by a user of the client device 106 to store the physical item 304 in the physical storage vault 140. The option may be a selectable graphical element of the user interface, for example, such as a button or a check box. The option to store the physical item 304 in the physical storage vault 140 may be selectable in other ways. For instance, the option to store the physical item 304 may be selectable based on receipt of a voice command or a gesture. Such an option may be selectable in other ways without departing from the spirit or scope of the described techniques.

In accordance with the described techniques, a user of the computing device selects via the user interface to initiate an ownership transfer of the physical item 304 and the NFT 302 of the combined listing 306 to a corresponding user account, and the user also selects via the user interface the option to store the physical item 304 in the physical storage vault 140. In other words, the user accepts the option to store the physical item 304 in the physical storage vault 140. Based on this user input, the client device 106 (e.g., via the application 142) generates transfer request 308, which digitally persists the selected request to transfer ownership of the physical item 304 and the NFT 302 of the combined listing 306 to the user account. The transfer request 308 also persists acceptance of the option to store the physical item 304 in the physical storage vault 140. In the illustrated example 300, the listing platform 134 is depicted receiving this transfer request 308.

Based on the transfer request 308, the listing platform 134 initiates a transfer of the NET 302 to a user account corresponding to the client device and causes the physical item 304 to be stored in the physical storage vault 140—the listing platform 134 may cause the physical item 304 to continue to be stored in the physical storage vault 140 or transferred to the physical storage vault 140 for storage.

To transfer the NFT 302 to the user account that corresponds to the client device 106, the listing platform 134 may provide NFT transfer instructions 310, e.g., to one or more of the nodes 112 in the network 114 of nodes. The NFT transfer instructions 310 may be configured according to and include data specified by a token standard, e.g., ERC-721 or ERC-1155, for transferring ownership of the NFT 302. In accordance with the described techniques, the information included in the NFT transfer instructions 310 enables a node 112 to programmatically encode in the NFT 302 information provided or indicated in the NFT transfer instructions 310. In one or more implementations, the NFT transfer instructions 310 include an identifier associated with the user account to which ownership of the NFT 302 is being transferred and the nodes 112 encode this identifier into the NFT 302 upon validation of the transfer. Once validated, the transfer is persisted in the transaction data 126 of the blockchain 116, including details about the transfer such as the identifier associated with the user account.

By way of example, the NFT transfer instructions 310 may include a first address of a digital wallet which corresponds to a user account that owns the NFT 302 and include a second address of a digital wallet which corresponds to the user account to which ownership of the NFT 302 is being transferred, e.g., a public address of the digital wallet 146. Here, the first and second addresses may correspond to the identifiers of the respective users. The NFT transfer instructions 310 may also include public keys associated with the addresses of those digital wallets, which one or more of the nodes 112 use to validate the transaction, i.e., the transfer to the user account corresponding to the client device 106 and the digital wallet 146. This validation may include interacting with the client device 106 and a device of the user account that owns the NFT 302, so that their private keys can be used to verify that the transfer is a legitimate transfer of the NFT 302.

As with other transactions on the blockchain 116, one or more of the nodes 112 determines whether the transfer of the NFT 302 to the user account is valid, e.g., using a consensus mechanism. If the nodes 112 determine that the transfer to the user account is a valid transaction, the nodes 112 commit the valid transfer to the blockchain 116. To do so, the nodes 112 may cause the public wallet addresses of the parties to the transaction (including the public address of the digital wallet 146) to be digitally recorded in the NFT 302's data on the blockchain 116. The NFT transfer instructions 310 may cause other data to be encoded into the NFT 302 to describe the transaction, including, for example, a location of the transaction, an indication that the owner of the physical item 304 permits it to be loaned from the physical storage vault 140 to loaner locations, a current location of the physical item 304, and/or a condition of the physical item 304, to name just a few.

In one or more implementations, transferring ownership of the NFT 302 to the user account provides access by the user account to a digital asset of the NFT 302, such as digital artwork. Examples of digital content which may be configured as digital assets include, but are not limited to, digital images, digital videos, in-game content, AR/VR content, text, 3D-models, compositions of multiple types of digital content, and digital trading cards, to name just a few. As discussed in relation to FIG. 2, such a digital asset may be encoded in the NFT 302 or an association with the digital asset (e.g., an identifier of the digital asset or a location of the digital asset (URL)) may be encoded in the NFT 302.

In addition to such features, the NFT 302 may encode various permissions that are granted to an owner of the NFT 302. One example of a permission is permitting the user account that owns the NFT 302 to have access to one or more digital assets of the NFT 302 as described just above. As another example, the NFT 302 may grant the user account permission to obtain the physical item 304 at a subsequent time, e.g., after the physical item 304 is stored in the physical storage vault 140 in connection with transfer of the physical item 304 and the NFT 302 to the user account. In order for the physical item 304 to be obtained from the physical storage vault 140, though, the physical item 304 must first be stored in the physical storage vault 140. In this context, consider the following discussion.

To cause the physical item 304 to be stored in the physical storage vault 140 the listing platform 134 issues storage instructions 312. The illustrated example 300 includes vault management system 314, which is configured to manage storage of physical items in the vault. The vault management system 314 may be included as part of the service provider system 104 in one or more implementations. Thus, the service provider system 104 (or one or more of its other components) may carry out the functionality of the vault management system 314 as discussed below. Alternatively, a portion or an entirety of the vault management system 314 may be operated by a third-party that interacts with one or more systems of the service provider system 104, such as with the listing platform 134.

The management carried out by the vault management system 314 may include, for example, obtaining physical items for storage in the vault, maintaining physical items stored in the vault, capturing and providing information about the physical items stored in the vault (e.g., videos or images) to owners of the physical items, causing the physical items in the vault to be moved (e.g., shipped) to loaner locations (e.g., temporarily) or to owners (e.g., for an indefinite amount of time or permanently), and so forth. The vault management system 314 may carry out this management in a variety of ways without departing from the spirit or scope of the described techniques. In this example 300, the vault management system 314 is depicted causing the physical storage vault 140 to obtain the physical item 304, e.g., for storage in the physical storage vault 140.

In a scenario where the physical item 304 is not stored in the physical storage vault 140 and where the transfer request 308 indicates that the option to store the physical item 304 in the physical storage vault 140 is accepted, the vault management system 314 may cause shipping instructions to be delivered to the transferor of the physical item 304, e.g., so that the transferor can ship the physical item 304 for storage in the physical storage vault 140 or so that the physical item 304 can be otherwise obtained (e.g., picked up) for storage in the physical storage vault 140. In other words, the vault management system 314 requests delivery of the physical item 304 from the user account of the transferor. The vault management system 314 may deliver shipping and/or pick up instructions digitally so that they are output by a client device, e.g., displayed via a user interface of an application. Alternatively or in addition, the vault management system 314 may send a notification to a logistics or shipping company to cause shipping materials (e.g., packaging and labels) to be shipped to an address of the user account of the transferor or an address corresponding to the physical item 304. Upon receipt of the physical item 304, the vault management system 314 may cause the physical item 304 to be stored in the physical storage vault 140.

In an alternative scenario where the physical item 304 is already stored in the physical storage vault 140 and where the transfer request 308 indicates that the option to store the physical item 304 in the physical storage vault 140 is accepted, the vault management system 314 may not tamper with the physical item 304 as stored—it may continue to have the physical item 304 stored in the physical storage vault 140. Alternatively or additionally, the vault management system 314 may change some indication of ownership of the physical item 304 as stored in the vault (e.g., a tag on the physical item or placement of the physical item within the vault). By way of contrast, in a scenario where the transfer request 308 indicates that the option to store the physical item 304 in the physical storage vault 140 is declined, the physical item 304 may simply be shipped to a location associated with a user account of the client device 106, e.g., by the listing platform 134, by the owner that transferred the physical item 304 and the NFT 302 to the user account, and/or by the vault management system 314 from the physical storage vault 140.

In addition to initiating acquisition of physical items of digital twin NFTs, e.g., by causing shipping and/or pick up instructions to be delivered, the vault management system 314 is also configured to cause physical items of digital twin NFTs to be transferred to other locations. For example, the vault management system 314 is configured to cause physical items to be transferred from the physical storage vault 140 to physical locations associated with an owner of the NET 302. In accordance with the described techniques, the vault management system 314 may also be configured to cause physical items stored in the physical storage vault 140 to be transferred to a loaner location 316.

Examples of loaner locations may include a museum, a location where a conference or a convention is being held (e.g., a collectible convention or gaming convention), a location where a show (e.g., an art show) is being held, a location of a renter of the physical item (e.g., to display art or memorabilia at a party), a location that may rotate display of physical items (e.g., a university or business), or a location for studying the item (e.g., a university or research laboratory), to name just a few. The arrow indicating transfer of the physical item 304 to the loaner location 316 is dashed to indicate that the transfer to such loaner locations is optional, i.e., it may be permitted in some circumstances and may not be permitted in other circumstances.

By way of example, a user associated with the loaner location 316 may request a loan of the physical item 304 for an amount of time and to receive and/or hold the physical item 304 at the loaner location 316. The request may also indicate one or more additional loaner locations at which the physical item 304 is to be held in connection with the loan. This request may specify other information about such a loan, including a benefit that is to be conferred to the user account of the physical item 304's owner if the user account accepts the request. Based on this, a request may be communicated to the user account of the physical item 304's owner to move the physical item to the loaner location 316, and this request may also include an indication of the benefit that is to be conferred to the user account for acceptance of the request.

For instance, the request may be sent to the user account so that an application (e.g., the application 142) causes the request to be output (e.g., displayed) via the client device 106 associated with the user account along with the benefit that is to be conferred for acceptance. This user interface may include one or more mechanisms that are selectable by the user to accept or deny the request to loan the physical item 304 to the loaner location 316. Responsive to receiving an acceptance of the request by the user account (e.g., via the user interface), the vault management system 314 may initiate transfer (e.g., shipment) of the physical item 304 from the physical storage vault 140 to the loaner location 316. Additionally, the vault management system 314 (or the listing platform 134) may confer the indicated benefit to the user account. Such a benefit may include exchange of a specified amount of cryptocurrency to the digital wallet 146, for example.

In addition to causing the physical item 304 to be shipped to the loaner location 316, the vault management system 314 may also cause the NET 302 to be updated on the blockchain 116 to encode the changes in location, e.g., so that a record of the physical item 304's location is encoded by the NFT 302 on the blockchain 116. By way of example, the vault management system 314 may issue instructions to one or more of the nodes 112 describing a transaction involving a transfer of location of the physical item 304. These instructions may be configured by the vault management system 314 according to the token standard. The vault management system 314 may issue such instructions for each location transfer of the physical item 304 to maintain a provenance of the physical item 304, in terms of its location in addition to ownership.

As noted above, the vault management system 314 may also cause the physical item 304 to be transferred to a location that corresponds to the user account to which the physical item 304 and the NFT 302 are transferred. For instance, the vault management system 314 may receive a request from the user account to obtain the physical item 304 from the physical storage vault 140. Based on this request, the vault management system 314 may verify that the user account is permitted to obtain the physical item 304 based at least in part on a permission granted by the NET 302, e.g., a permission encoded in the NFT 302. This permission may be updated by the one or more nodes 112 in connection with transferring the NET 302 to the user account to specify that the user account may physically obtain the physical item 304—it may be updated from enabling the previous owner's user account to physically obtain the physical item 304. Responsive to verifying that the NET 302 grants the user account permission to obtain the physical item, the vault management system 314 may initiate shipment of the physical item 304 from the physical storage vault 140 to a shipping location associated with the user account, e.g., the shipping location may be specified by user input received via a user interface output by the client device 106 or maintained as part of the user account.

Here, the transfer from the physical storage vault 140 to a physical location associated with the owner account is illustrated by the dashed arrow from the physical storage vault 140 to the client device 106. This arrow is dashed in the illustrated example to indicate that the physical transfer to a location associated with the user account is optional. For instance, a user associated with the client device 106 may not select to physically obtain the physical item 304 at any time—despite owning the physical item 304. Instead, the user may simply wish to have the physical item 304 held in the physical storage vault 140 for safe keeping, e.g., this may be the case for valuable items or items that may be easily damaged in transport or through ownership.

Alternatively, the owner of the physical item 304 may select to temporarily obtain the physical item 304 from the physical storage vault 140, e.g., for an event, such that the user causes the item to be returned to the physical storage vault 140 after a period of time, e.g., after the event. In one or more implementations, the NFT 302 may grant the user account permission to physically obtain the physical item 304 on a limited basis and then return the physical item 304 to the physical storage vault 140. For example, the NFT 302 may grant the user account an amount of time to physically possess per interval of time (e.g., days or hours per year). Such permissions may be granted when the NFT 302 enables fractional ownership of the physical item 304, for example.

In one or more implementations, the physical storage vault 140 can be used to transfer ownership of a physical item that is stored in the physical storage vault 140 but does not have a corresponding digital twin NFT. Instead, ownership of the physical item may be controlled in such implementations using a different approach, such as a verifiable credential which provides a more centralized approach to ownership than use of NFTs on the blockchain 116.

In such scenarios, a decentralized identifier network, running on top of a blockchain (e.g., blockchain 116), may enable a user to interact with the network via his or her computing device to create a decentralized identifier (DID). Once created, the computing device can associate the DID with a user account of the user, such as a user account with the listing platform 134 and/or a provider of the physical storage vault 140, e.g., the vault management system 314. In accordance with the described techniques, the user obtains ownership of a physical item which is stored in the physical storage vault 140, such as by purchasing the physical item via a listing of the physical item published by the listing platform 134.

Based on obtaining ownership, the vault management system 314 or an authentication service provider issues a verifiable credential that the user, having the DID associated with the user account, is the owner of the physical item. The verifiable credential enables this ownership of the physical item to be expressed in a way that is cryptographically secure, privacy respecting, and machine verifiable. Additionally, the verifiable credential may be usable to grant the user access to a digital twin of the physical item through a computing device, e.g., for use in AR/VR, video games, a digital picture frame, and so on. Alternatively or additionally, the verifiable credential is usable to grant the user access to the physical item or a digital asset associated with the physical item, e.g., as an owner vs. a renter, as an exhibitioner, and so on.

In one or more implementations, the vault management system 314 and/or the listing platform 134 may also create verifiable credentials that are different from ownership credentials. For example, the vault management system 314 and/or the listing platform 134 may create verifiable credentials for renters having a DID or for exhibitioners having a DID. The vault management system 314 and/or the listing platform 134 may create such credentials responsive to a user selection via a user interface to generate such credentials for these users. By way of example, the user interface may display to an owner of the physical item (as indicated by the owner's DID and verifiable credentials) an option that is selectable to cause verifiable credentials to be generated for another user. In this way, the user can enable the other user to rent the physical item or the digital asset or enable the other user to exhibit the physical item or the digital asset. The use of verifiable credentials and DIDs enables insurance providers to verify ownership of items for premium calculations and enables credit providers to verify ownership of the items for lines of credit against those items.

Advantages of using DIDs and verifiable credentials may include increased privacy because the verifiable credential is known only to the DID owner and to the issuer of the credential, e.g., the vault management system 314 or the listing platform 134. Additionally, the verifiable credential can be implemented in various scenarios without the credential being publicly accessible on a blockchain. This contrasts with NFT possession where the owner's wallet address is publicly accessible, e.g., when implemented on a public blockchain such as Ethereum. Verifiable credentials also enable permissions to be granted, such as permissions to access physical items and their associated digital twin items (e.g., digital content). Moreover, the vault management system 314 or the listing platform 134 may revoke a credential, such as based on damage to the physical item or for another reason (e.g., a legal reason). In this way, DIDs may be distributed and secured by the same public-private-key mechanisms on the blockchain 116 and use of wallets as NFTs, but the verifiable credentials can be created by a centralized authority (e.g., the vault management system 314 or the listing platform 134) and/or by a decentralized protocol based on a smart contract.

Figure 4:
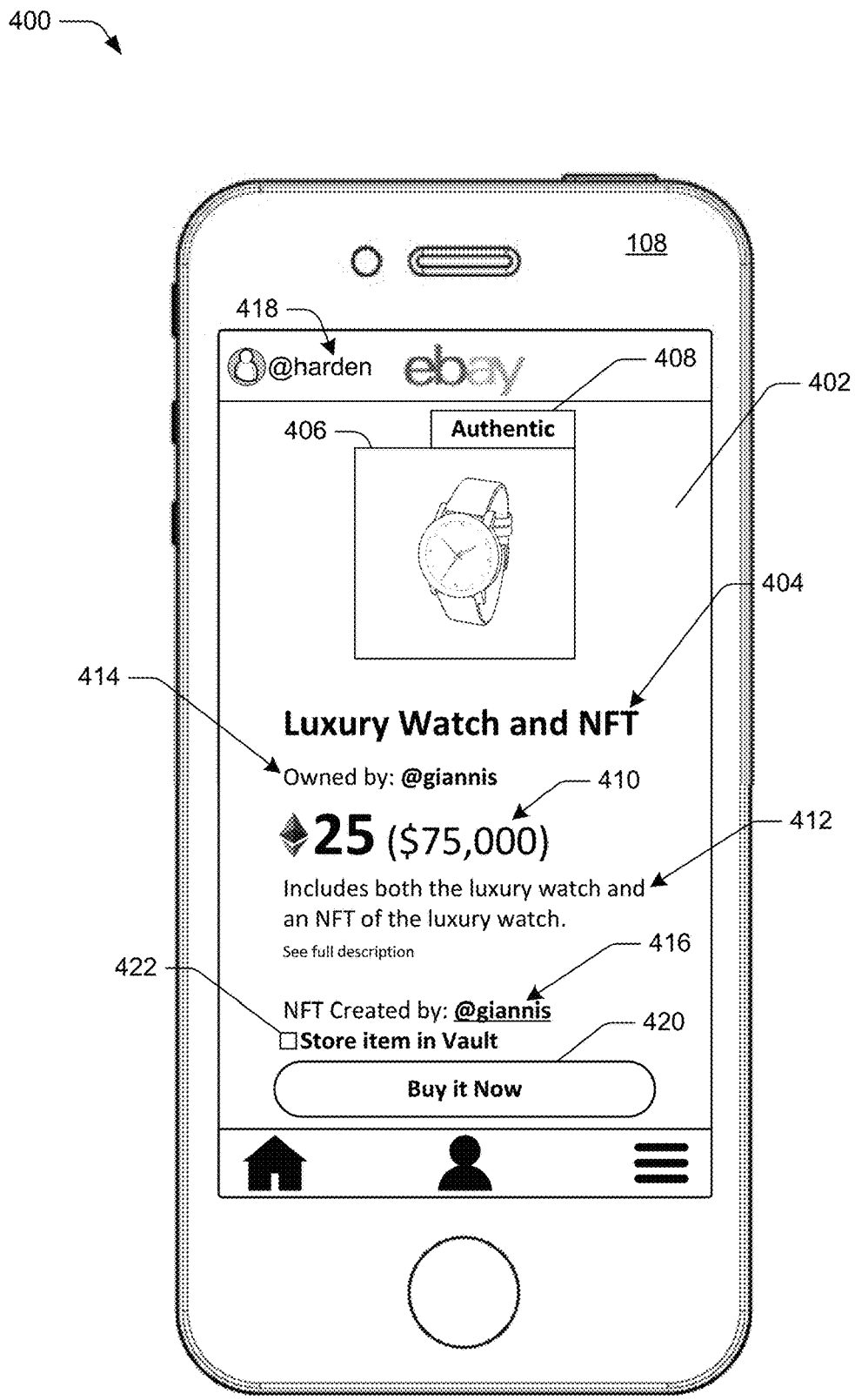
FIG. 4 depicts an example implementation of a combined listing of a physical item and an NET which includes an option to store the physical item in a physical storage vault.

FIG. 4 depicts an example 400 of a combined listing of a physical item and an NFT which includes an option to store the physical item in a physical storage vault.

The illustrated example 400 includes a combined listing 402 which lists both a physical item and an NFT of the physical item together. For example, the combined listing 402 may list the combination of the physical item and the NFT for sale together via the listing platform 134. In this example, the combined listing 402 lists the combination of a luxury watch and an NFT of the luxury watch which is minted on the blockchain 116.

The listing platform 134 can output the combined listing 402, such as by publishing the combined listing 402 to one or more client devices, e.g., associated with user accounts of the service provider system 104 or that navigate to user interfaces of the service provider system 104. The listing platform 134 may expose the combined listing 402 to a plurality of client devices, such that users navigating to the listing or searching for listings can view the combined listing 402. In this example, the combined listing 402 is depicted as being displayed by a web application (e.g., the application 148) via a user interface at the client device 108. The client device 108 may correspond to a different device than the client device 106 which was utilized to generate the combined listing 402.

In this example, the combined listing 402 includes a combined listing title 404, an image 406 of the physical item, an authenticity indicator 408, a price 410, a combined listing description 412, ownership information 414, creator information 416, a user account identifier 418, and a selectable control 420 that is selectable to initiate the purchase of the luxury watch and the NFT.

The combined listing title 404 indicates that the combined listing 402 is for both the "Luxury Watch and NFT", and the image 406 corresponds to an image of the luxury watch. In some cases, the image 406 may correspond to digital content of the NFT itself. The authenticity indicator 408 indicates that the physical item has been verified as being authentic by the authentication service system 132. The price 410, in this example, is shown as 25 ETH which indicates that the user can obtain the combined listing for 25 ETH (which corresponds to $75,000 US Dollars based on a current valuation of 1 ETH being worth $3,000 US Dollars). The combined listing description 412 includes a description of the combined listing, and can be expanded in some cases to view additional information regarding the combined listing.

In the illustrated example 400, the ownership information 414 and the creator information 416 indicate that both the current owner and creator of the NFT correspond to the same user profile, "@giannis". The user account identifier 418 indicates that the user "@harden" is signed into a user account associated with the service provider system 104. Notably if the @harden user purchases both the luxury watch and the NFT of the combined listing 402, e.g., by selecting the selectable control 418 to transfer 25 ETH to the @giannis user, then the ownership information 414 will change to indicate that @harden is the current owner of the NFT. In this scenario, however, the creator information 416 will remain the same to signify that @harden is not the original creator of the NFT. [ono] In this example, the combined listing 402 further includes a selectable option 422 to store the physical item in a physical storage vault. The user can select this option, by providing input to "check" the box of the selectable option 422, and then select the selectable control 420 in order to obtain ownership of both the physical item and the NFT of the combined listing 402. For example, selection of the selectable control 420, while the box of the selectable option 422 is "checked", may transfer ownership of the NFT to the @harden user account by encoding metadata of the NFT on the blockchain 116 in exchange for the @harden providing 25 ETH to the @giannis user account. In addition to transferring ownership of the NFT on the blockchain 116 in exchange for cryptocurrency, however, the listing platform 134 communicates storage instructions 312 to the vault management system 314 because the selectable option 422 is checked. The storage instructions 312 instruct the vault management system 314 to store the physical item of the combined listing 402 in the physical storage vault 140. For example, if the luxury watch of the combined listing is currently stored in the physical storage vault 140, then the storage instructions 312 will cause the vault management system 314 to maintain storage of the luxury watch in the physical storage vault 140. Alternately, if the luxury watch is not currently stored in the physical storage vault 140, then the storage instructions 312 may cause the vault management system to obtain the luxury watch, e.g., by generating a request to the @giannis user account in order to first obtain the luxury watch from the @giannis user account and then store the luxury watch in the physical storage vault 140.

Figure 5:
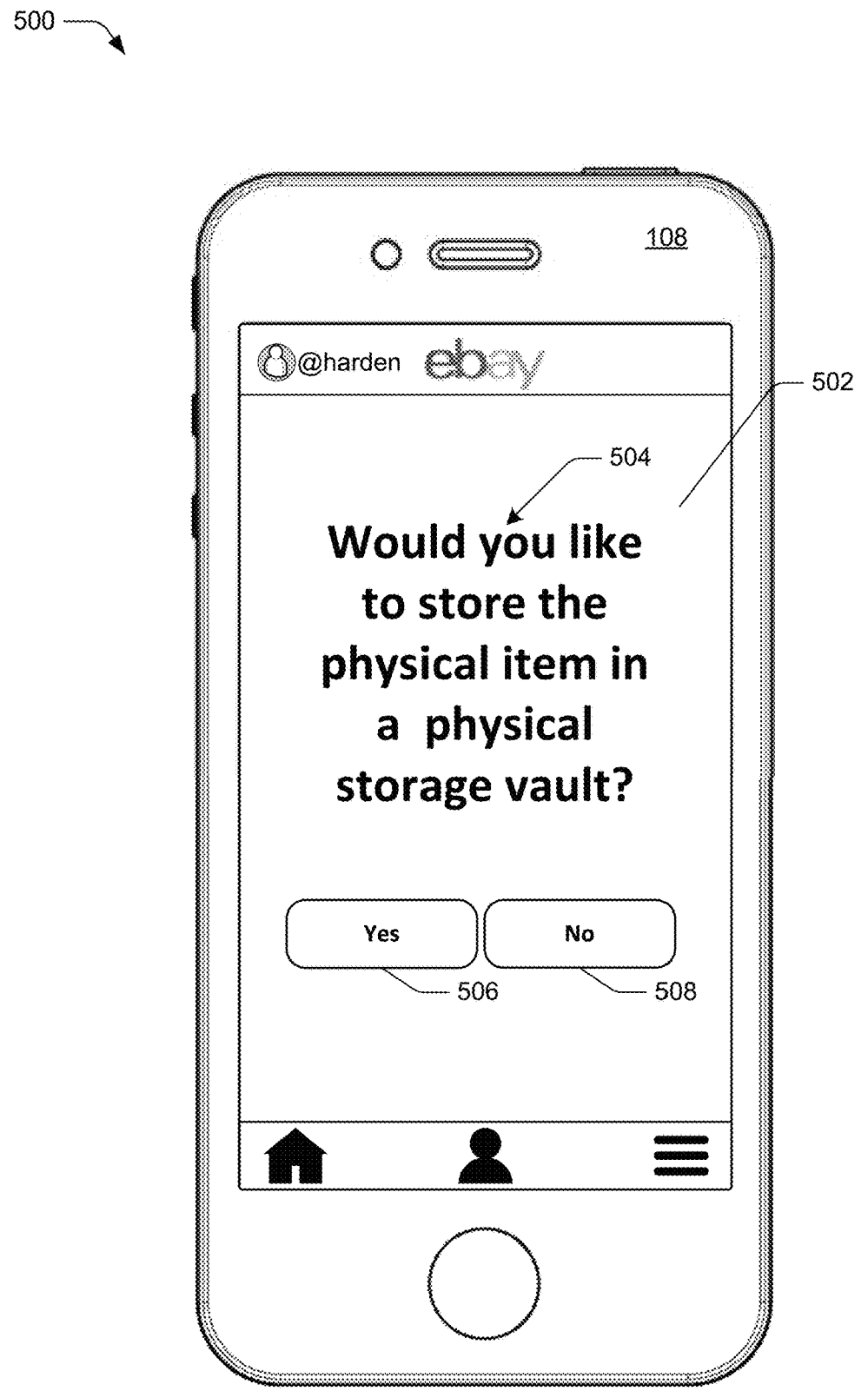
FIG. 5 depicts an example implementation of a user interface which may be presented by the listing platform and includes an option to store the physical item in a physical storage vault.

FIG. 5 depicts an example 500 of an alternative user interface which may be presented by the listing platform and includes an option to store the physical item in a physical storage vault. In the illustrated example 500, a user interface 502 is displayed on the display device of client device 108. The user interface includes information 504 which asks the user if the user would like "to store the physical item in a physical storage vault." The user interface 502 also includes selectable controls 506 and 508 which provide an option to store the physical item in a physical storage vault. For example, the user can select the selectable control 506 ("Yes") in order to cause the physical item to be stored in the physical storage vault 140, or select the selectable control 508 ("No") to prevent the physical item from being stored in the physical storage vault.

The user interface 502 may be displayed to the user, for example, responsive to the user selecting the selectable control 420 depicted in FIG. 4 to purchase the luxury watch and the NFT of the combined listing 402. Alternatively or additionally, the user interface may be displayed to the user in the form of an electronic message, such as an email message or a text message that is communicated to the user account after the user account purchases the physical item and the NFT of the combined listing 402. It is to be appreciated that the option to store the physical item of a combined listing in a physical storage vault may provided to the user in a variety of different ways without departing from the spirit or the scope of the described techniques.

Figure 6:
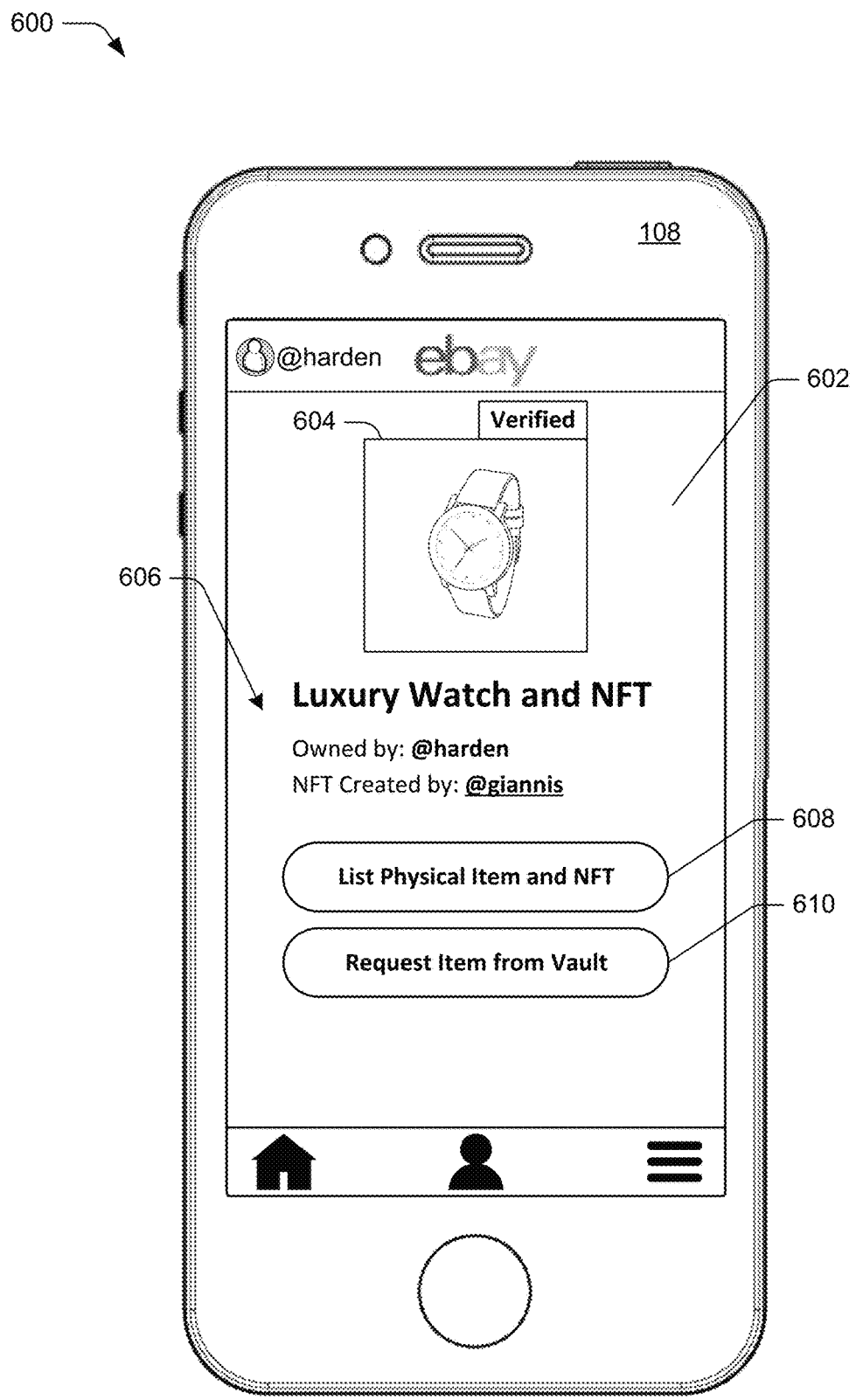
FIG. 6 depicts an example implementation of a dashboard user interface for controlling storage of physical items in a physical storage vault.

FIG. 6 depicts an example 600 of a dashboard user interface for controlling storage of physical items in a physical storage vault. In the illustrated example 600, a dashboard user interface 602 is displayed on the display device of a client device 108. The computing device corresponds to the user account @harden which purchased the physical item and the NFT of the combined listing 402. In this instance, the user account @harden selected the option to store the physical item in the physical storage vault 140. Thus, while @harden has access to the NFT of the luxury watch, @harden does not physically possess the luxury watch as it is currently stored in the physical storage vault 140. The dashboard user interface 602 includes an image 604 of the physical item, along with information 606 corresponding to the physical item and the NFT. In this example, the information 606 includes a description of the luxury watch and the NFT, as well as ownership information indicating that the user profile @harden currently owns the NFT and creator information indicating that the user profile @giannis is the original creator of the NFT.

The dashboard user interface 602 also includes a selectable element 608 which can be selected to "re-list" both the physical item and the NFT as a combined listing on the listing platform 134. For example, selection of the selectable element 608 initiates a process in which a combined listing is generated, similar to the combined listing 402 depicted in FIG. 4. Unlike the combined listing 402, however, the ownership information of this new combined listing will indicate that @harden is the current owner of the physical item and the NFT. Notably, because @harden has decided to store the physical item in the physical storage vault, a new buyer that purchases the physical item and the NFT of the combined listing may choose to keep the physical item stored in the physical storage vault 140. Moreover, @harden will not have to be concerned with shipping the physical item to the physical storage vault 140 or directly to the new buyer, because the physical item is already stored in the physical storage vault 140.

The dashboard user interface 602 also includes a selectable element 610 which is selectable to request the physical item from the physical storage vault 140. For example, selection of the selectable element 610 may cause instructions to be communicated from the client device 108 to the vault management system 314. The instructions may request that the vault management system ship the luxury watch to a physical address specified by the request, e.g., the user's home address, a loaner location, and so forth.

Having discussed exemplary details of the techniques a physical storage vault for physical items of digital twin NFTs, consider now some examples of procedures to illustrate additional aspects of the techniques.

Example Procedures

This section describes examples of procedures for a physical storage vault for physical items of digital twin NFTs. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 7:
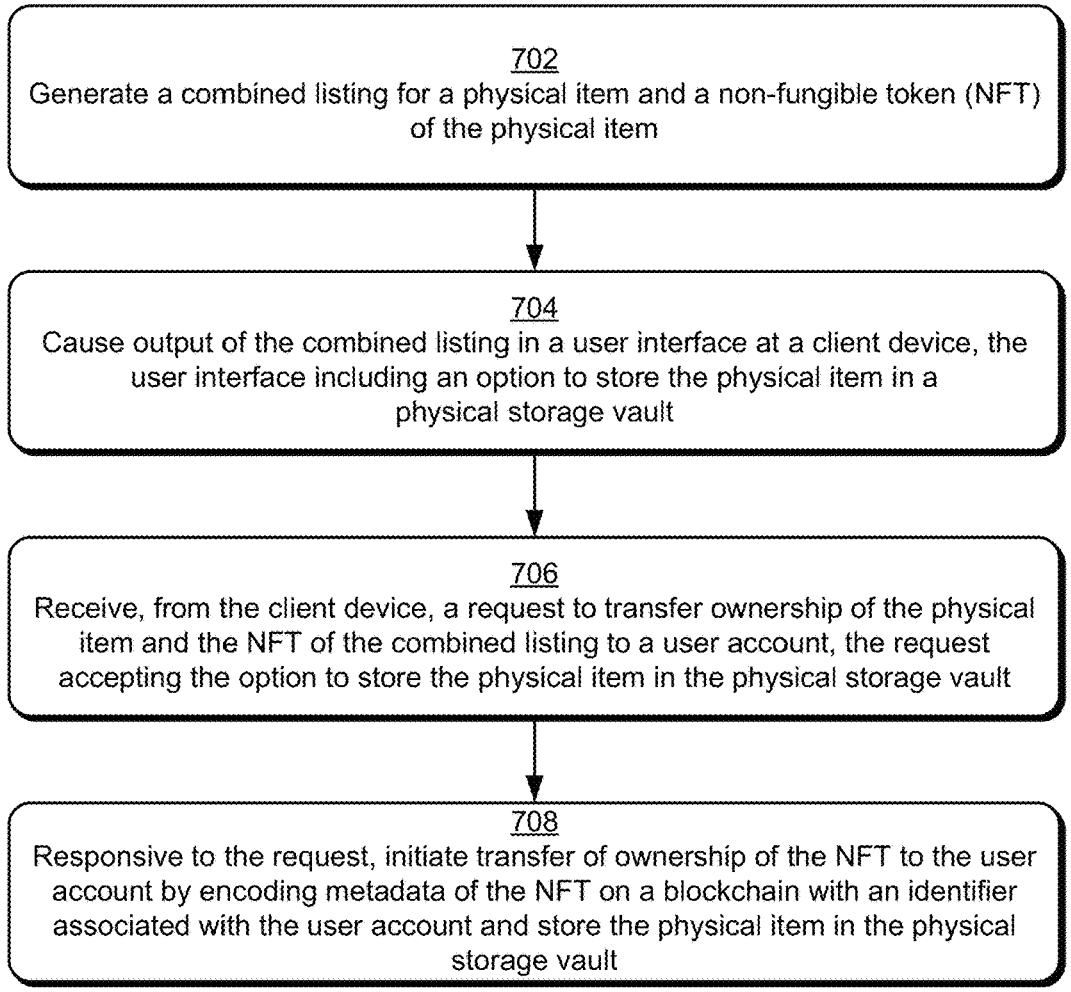
FIG. 7 depicts a procedure in an example implementation of initiating transfer of ownership of an NET of a physical item and causing the physical item to be stored in a physical storage vault.

FIG. 7 depicts a procedure 700 in an example implementation of initiating transfer of ownership of an NFT of a physical item and causing the physical item to be stored in a physical storage vault.

A combined listing for a physical item and a non-fungible token (NET) of the physical item is generated (block 702). By way of example, the listing platform 134 generates a combined listing 306, which lists both the physical item 304 and the NFT 302 together. For example, the combined listing 306 may list the combination of the physical item 304 and the NET 302 for transfer (e.g., sale or auction) together via the listing platform 134.

The combined listing is output in a user interface at a client device (block 704). In accordance with the principles discussed herein, the user interface that is output at the client device includes an option to store the physical item in a physical storage vault. By way of example, the listing platform 134 outputs the combined listing 306. This output of the combined listing 306 may correspond to publishing the combined listing 306 to a plurality of client devices, including the client device 106. For example, the combined listing 306 may be displayed or otherwise output by a web application (e.g., the application 142) via a user interface at the client device 106. In one or more implementations, the listing platform 134 may expose the combined listing 306 to a plurality of client devices, such that users navigating to the listing or searching for listings can view the combined listing 306. The client device 106 or 108 outputs the combined listing 306 via a user interface, e.g., by displaying the combined listing 402. The combined listing includes an option that is selectable by a user of the client device 106 or 108 to store the physical item 304 in the physical storage vault 140. The option may be a selectable graphical element of the user interface, for example, such as a button or a check box, e.g., selectable option 422.

A request to transfer ownership of the physical item and the NFT of the combined listing to a user account is received (block 706). In accordance with the principles discussed herein, the request accepts the option to store the physical item in the physical storage vault. By way of example, the user of client device 106 or 108 selects via the user interface to initiate an ownership transfer of the physical item 304 and the NFT 302 of the combined listing 306 to a corresponding user account, and the user also selects via the user interface the option to store the physical item 304 in the physical storage vault 140. In other words, the user accepts the option to store the physical item 304 in the physical storage vault 140. Based on this user input, the client device 106 or 108 (e.g., via the application 142 or 148) generates transfer request 308, which digitally persists the selected request to transfer ownership of the physical item 304 and the NFT 302 of the combined listing 306 to the user account. The transfer request 308 also persists acceptance of the option to store the physical item 304 in the physical storage vault 140. The listing platform 134 then receives the transfer request 308.

Responsive to the request, ownership of the NFT is initiated for transfer to the user account by encoding metadata of the NFT on a blockchain with an identifier associated with the user account and the physical item is initiated for transfer to the physical storage vault (block 708). By way of example, based on the transfer request 308, the listing platform 134 initiates a transfer of the NFT 302 to a user account corresponding to the client device 106 or 108 and causes the physical item 304 to be stored in the physical storage vault 140—the listing platform 134 may cause the physical item 304 to continue to be stored in the physical storage vault 140 or transferred to the physical storage vault 140 for storage.

For example, to transfer the NET 302 to the user account that corresponds to the client device 106, the listing platform 134 may provide NFT transfer instructions 310, e.g., to one or more of the nodes 112 in the network 114 of nodes. The NET transfer instructions 310 may be configured according to and include data specified by a token standard, e.g., ERC-721 or ERC-1155, for transferring ownership of the NET 302. In accordance with the described techniques, the information included in the NET transfer instructions 310 enables a node 112 to programmatically encode in the NFT 302 information provided or indicated in the NET transfer instructions 310.

To cause the physical item 304 to be stored in the physical storage vault 140 the listing platform 134 communicates storage instructions 312 to the vault management system 314. In a scenario where the physical item 304 is not stored in the physical storage vault 140 and where the transfer request 308 indicates that the option to store the physical item 304 in the physical storage vault 140 is accepted, the vault management system 314 may cause shipping instructions to be delivered to the transferor of the physical item 304, e.g., so that the transferor can ship the physical item 304 for storage in the physical storage vault 140 or so that the physical item 304 can be otherwise obtained (e.g., picked up) for storage in the physical storage vault 140. Alternatively or in addition, the vault management system 314 may send a notification to a logistics or shipping company to cause shipping materials (e.g., packaging and labels) to be shipped to an address of the user account of the transferor or an address corresponding to the physical item 304. Upon receipt of the physical item 304, the vault management system 314 may cause the physical item 304 to be stored in the physical storage vault 140.

In an alternative scenario where the physical item 304 is already stored in the physical storage vault 140 and where the transfer request 308 indicates that the option to store the physical item 304 in the physical storage vault 140 is accepted, the vault management system 314 may not tamper with the physical item 304 as stored—it may continue to have the physical item 304 stored in the physical storage vault 140. Alternatively or additionally, the vault management system 314 may change some indication of ownership of the physical item 304 as stored in the vault (e.g., a tag on the physical item or placement of the physical item within the vault). By way of contrast, in a scenario where the transfer request 308 indicates that the option to store the physical item 304 in the physical storage vault 140 is declined, the physical item 304 may simply be shipped to a location associated with a user account of the client device 106, e.g., by the listing platform 134, by the owner that transferred the physical item 304 and the NFT 302 to the user account, and/or by the vault management system 314 from the physical storage vault 140.

Having described examples of procedures in accordance with one or more implementations, consider now an example of a system and device that can be utilized to implement the various techniques described herein.

Example System and Device

Figure 8:
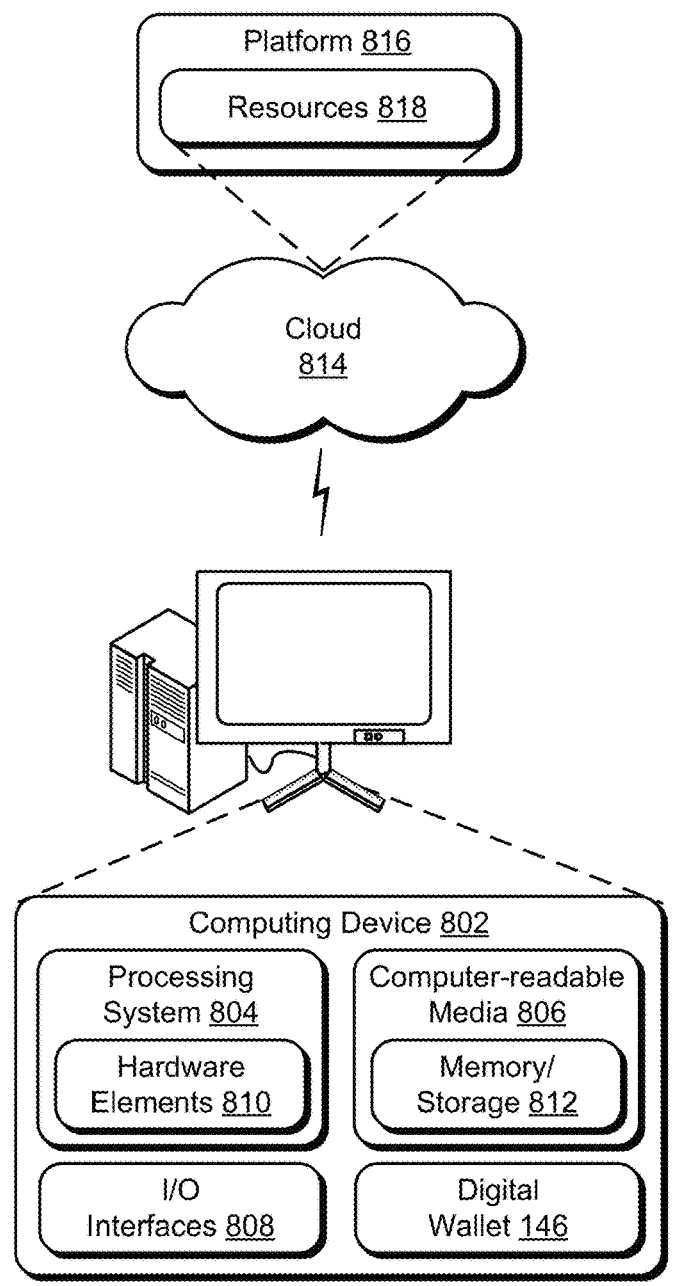
FIG. 8 illustrates an example of a system including various components of an example device that can be implemented as any type of computing device as described and/or utilized with reference to FIGS. 1-7 to implement embodiments of the techniques described herein.

FIG. 8 illustrates an example of a system generally at 800 that includes an example of a computing device 802 that is representative of one or more computing systems and/or devices that may implement the various techniques described herein. This is illustrated through inclusion of the digital wallet 146. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method comprising:
   generating a combined listing for an online marketplace, the combined listing providing on the online marketplace a combination of both a physical item for sale that is transferrable to and from a physical storage vault and a non-fungible token (NFT) for sale of the physical item, wherein the NFT is minted using information about the physical item;
   causing output of the combined listing in a user interface at a client device, the user interface including the combination of both the physical item for sale that is transferrable to and from the physical storage vault and the NFT for sale of the physical item, and the user interface including an option to store the physical item in the physical storage vault;
   receiving, from the client device, a request to transfer ownership of the physical item and the NFT of the combined listing to a user account, the request accepting the option to store the physical item in the physical storage vault;
   responsive to the request, initiating transfer of ownership of the NFT to the user account by encoding metadata of the NFT on a blockchain with an identifier associated with the user account and storing the physical item in the physical storage vault, wherein, based on storing the physical item, the physical item is held in the physical storage vault for safe keeping until an additional request for obtaining the item from the physical storage vault is received;
   receiving, at a subsequent time, the additional request from the user account for obtaining the physical item from the physical storage vault;
   verifying that the user account is permitted to obtain the physical item based on a permission granted by the NFT, wherein the NFT grants the permission to the user account to obtain the physical item from the physical storage vault; and
   initiating shipment of the physical item from the physical storage vault to a shipping location associated with the user account.

2. The computer-implemented method of claim 1, wherein transferring the ownership of the NFT to the user account provides access by the user account to a digital asset of the NFT.

3. The computer-implemented method of claim 1, wherein the subsequent time is subsequent to a time that corresponds to storing the physical item in the physical storage vault.

4. The computer-implemented method of claim 1, wherein the storing the physical item in the physical storage vault comprises causing the physical item to remain in the physical storage vault.

5. The computer-implemented method of claim 1, wherein the combined listing, providing the combination of both the physical item for sale that is transferrable to and from the physical storage vault and the NFT for sale of the physical item, is associated with an additional user account.

6. The computer-implemented method of claim 5, wherein the storing the physical item in the physical storage vault further comprises requesting delivery of the physical item from the additional user account and storing the physical item in the physical storage vault upon receipt of the physical item.

7. The computer-implemented method of claim 5, wherein the transfer of ownership of the NFT to the user account transfers ownership of the NFT on the blockchain from the additional user account to the user account.

8. The computer-implemented method of claim 1, wherein the physical item is shipped to a shipping location associated with the user account if the request declines the option to store the physical item in the physical storage vault.

9. The computer-implemented method of claim 1, further comprising:
   communicating a request to the user account to move the physical item to a loaner location along with an indication of a benefit for acceptance of the request;
   responsive to receiving an acceptance of the request by the user account, initiating transfer of the physical item from the physical storage vault to the loaner location; and
   conferring the benefit to the user account.

10. The computer-implemented method of claim 9, further comprising updating the metadata of the NFT on the blockchain to indicate that the physical item is transferred to the loaner location.

11. The computer-implemented method of claim 1, wherein the identifier associated with the user account comprises an address of a digital wallet associated with the user account.

12. The computer-implemented method of claim 1, wherein minting the NFT using the information about the physical item includes causing the NFT to be created on the blockchain and programmatically encoding an association of the information about the physical item with the NFT, wherein the information about the physical item programmatically encoded is captured with one or more sensors during a scan of the physical item.

13. A system comprising:
a physical storage vault;
a listing platform to:
generate a combined listing for an online marketplace, the combined listing providing on the online marketplace a combination of both a physical item for sale that is transferrable to and from a physical storage vault and a non-fungible token (NFT) for sale of the physical item, wherein the NFT is minted using information about the physical item;
receive, from a client device, a request to transfer ownership of the NFT to a user account and store the physical item in a physical storage vault; and
responsive to the request, initiate transfer of ownership of the NFT to the user account by encoding metadata of the NFT on a blockchain with an identifier associated with the user account; and
a vault management system, including computer hardware, to:
facilitate storage of the physical item in the physical storage vault, wherein, based on storing the physical item, the physical item is held in the physical storage vault for safe keeping until an additional request for obtaining the item from the physical storage vault is received;
receive, at a subsequent time, the additional request from the user account for obtaining the physical item from the physical storage vault;
verify that the user account is permitted to obtain the physical item based on a permission granted by the NFT, wherein the NFT grants the permission to the user account to obtain the physical item from the physical storage vault; and
initiate shipment of the physical item from the physical storage vault to a shipping location associated with the user account.

14. The system of claim 13, wherein the combined listing, providing the combination of both the physical item for sale that is transferrable to and from the physical storage vault and the NFT for sale of the physical item, is associated with an additional user account, and wherein the vault management system is further configured to request delivery of the physical item from the additional user account and cause the physical item to be stored in the physical storage vault upon receipt of the physical item from the additional user account.

15. The system of claim 14, wherein the transfer of ownership of the NFT to the user account transfers ownership of the NFT on the blockchain from the additional user account to the user account.

16. The system of claim 13, wherein the subsequent time is subsequent to a time that corresponds to storing the physical item in the physical storage vault.

17. One or more computer-readable storage media comprising instructions stored thereon that, responsive to execution by one or more processors, perform operations comprising:
generating a combined listing for an online marketplace, the combined listing providing on the online marketplace a combination of both a physical item for sale that is transferrable to and from a physical storage vault and a non-fungible token (NFT) for sale of the physical item, wherein the NFT is minted using information about the physical item;
causing output of the combined listing in a user interface at a client device, the user interface including the combination of both the physical item for sale that is transferrable to and from the physical storage vault and the NFT for sale of the physical item, and the user interface including an option to store the physical item in the physical storage vault;
receiving, from the client device, a request to transfer ownership of the physical item and the NFT of the combined listing to a user account, the request accepting the option to store the physical item in the physical storage vault;
responsive to the request, initiating transfer of ownership of the NFT to the user account by encoding metadata of the NFT on a blockchain with an identifier associated with the user account and storing the physical item in the physical storage vault, wherein, based on storing the physical item, the physical item is held in the physical storage vault for safe keeping until an additional request for obtaining the item from the physical storage vault is received;
receiving, at a subsequent time, the additional request from the user account for obtaining the physical item from the physical storage vault;
verifying that the user account is permitted to obtain the physical item based on a permission granted by the NFT, wherein the NFT grants the permission to the user account to obtain the physical item from the physical storage vault; and
initiating shipment of the physical item from the physical storage vault to a shipping location associated with the user account.

18. The one or more computer-readable storage media of claim 17, wherein transferring the ownership of the NFT to the user account provides access by the user account to a digital asset of the NFT.

19. The one or more computer-readable storage media of claim 17, wherein the subsequent time is subsequent to a time that corresponds to storing the physical item in the physical storage vault.

20. The one or more computer-readable storage media of claim 17, wherein minting the NFT using the information about the physical item includes causing the NFT to be created on the blockchain and programmatically encoding an association of the information about the physical item with the NFT, wherein the information about the physical item programmatically encoded is captured with one or more sensors during a scan of the physical item.

* * * * *